United States Patent
Rothschild et al.

(10) Patent No.: US 11,595,447 B2
(45) Date of Patent: Feb. 28, 2023

(54) ALTERATION OF EVENT USER INTERFACES OF AN ONLINE CONFERENCING SERVICE

(71) Applicant: Toucan Events Inc., New York, NY (US)

(72) Inventors: Ivo Walter Rothschild, Quebec (CA); Paul Robert Murphy, Bangkok (TH); Asahi Sato, London (GB); Antonia Theodora Hellman, New York, NY (US); Ethan Duncan He-Li Hellman, New York, NY (US); Steven Emmanuel Hellman, New York, NY (US)

(73) Assignee: Toucan Events Inc., New York, NY (US)

( * ) Notice: Subject to any disclaimer, the term of this patent is extended or adjusted under 35 U.S.C. 154(b) by 0 days.

(21) Appl. No.: 17/392,857

(22) Filed: Aug. 3, 2021

(65) Prior Publication Data
US 2022/0046066 A1 Feb. 10, 2022

Related U.S. Application Data

(60) Provisional application No. 63/180,342, filed on Apr. 27, 2021, provisional application No. 63/061,576, filed on Aug. 5, 2020.

(51) Int. Cl.
*H04L 65/1059* (2022.01)
*H04L 65/403* (2022.01)

(52) U.S. Cl.
CPC ........ *H04L 65/1059* (2013.01); *H04L 65/403* (2013.01)

(58) Field of Classification Search
CPC .......................... H04L 65/1059; H04L 65/403
(Continued)

(56) References Cited

U.S. PATENT DOCUMENTS

| 7,421,660 B2 | 9/2008 | Charnock et al. |
| 8,290,926 B2 | 10/2012 | Ozzie et al. |

(Continued)

FOREIGN PATENT DOCUMENTS

| CN | 111654661 A | 9/2020 |
| WO | 2021071524 A1 | 4/2021 |

OTHER PUBLICATIONS

Ken Molay, WebEx Participant Control Is A Mute Point, Jun. 13, 2016, wsuccess.typepad.com/, https://wsuccess.typepad.com/webinarblog/2016/06/webex-participant-control-is-a-mute-point.html (Year: 2016).*

(Continued)

*Primary Examiner* — Zi Ye
(74) *Attorney, Agent, or Firm* — Kowert, Hood, Munyon, Rankin & Goetzel, P.C.

(57) ABSTRACT

Techniques are disclosed relating to automatically altering a displayed user interface for an event. A server computer system may cause, via a conferencing service, display of a user interface for an event having a group of users accessing the conferencing service via a plurality of user devices, the displayed interface including an indication of a video feed of a user in the group of users that is currently active. The system may store, in a database, data for the event, including content of audio and video feeds of users in the event. The system may analyze a set of characteristics included in the content of the audio and video feeds. The system may alter, while the indication of the video feed of the user is being displayed, aspects of the displayed user interface other than the indication, where the altering is performed based on the analyzing.

20 Claims, 17 Drawing Sheets

(58) Field of Classification Search
USPC .......................................................... 709/204
See application file for complete search history.

(56) References Cited

U.S. PATENT DOCUMENTS

| | | | |
|---|---|---|---|
| 8,316,089 B2 | 11/2012 | Thakkar et al. | |
| 8,791,977 B2 | 7/2014 | Marvit | |
| 8,793,324 B1 | 7/2014 | Schabes et al. | |
| 8,848,027 B2 | 9/2014 | DeLand | |
| 9,071,728 B2 | 6/2015 | Begeja et al. | |
| 9,319,442 B2 | 4/2016 | Griffin et al. | |
| 9,560,152 B1 | 1/2017 | Jamdar et al. | |
| 9,634,855 B2 | 4/2017 | Poltorak | |
| 9,648,061 B2 | 5/2017 | Silva et al. | |
| 10,127,928 B2 | 11/2018 | Gainsboro et al. | |
| 10,142,276 B2 | 11/2018 | Rapaport et al. | |
| 10,296,530 B2 | 5/2019 | Zheng et al. | |
| 10,334,207 B2 | 6/2019 | Clavel et al. | |
| 10,389,662 B2 | 8/2019 | Chudge et al. | |
| 10,440,325 B1 | 10/2019 | Boxwell et al. | |
| 10,459,914 B2 | 10/2019 | Frenkel et al. | |
| 10,547,654 B2 | 1/2020 | Faulkner | |
| 10,558,751 B2 | 2/2020 | Li et al. | |
| 10,565,268 B2 | 2/2020 | Winnemoeller et al. | |
| 10,691,726 B2 | 6/2020 | Rapaport et al. | |
| 10,805,365 B2 | 10/2020 | Bader-Natal et al. | |
| 10,867,610 B2 | 12/2020 | Gurvich et al. | |
| 10,931,941 B2 | 2/2021 | Valdivia et al. | |
| 10,956,831 B2 | 3/2021 | Bellamy et al. | |
| 10,979,465 B2 | 4/2021 | Mombourquette et al. | |
| 11,050,976 B2 | 6/2021 | Hegde et al. | |
| 11,069,367 B2 | 7/2021 | Gibbon et al. | |
| 2002/0097688 A1* | 7/2002 | Norris .................. | G06Q 10/10 370/260 |
| 2004/0047461 A1* | 3/2004 | Weisman .............. | H04M 3/567 379/202.01 |
| 2005/0283475 A1* | 12/2005 | Beranek .............. | G06F 16/3334 704/E15.004 |
| 2009/0063991 A1* | 3/2009 | Baron ................. | H04L 12/1822 715/751 |
| 2010/0188475 A1* | 7/2010 | Le Goff ................. | G10L 15/26 348/14.08 |
| 2016/0073059 A1* | 3/2016 | Bader-Natal ........ | G06F 3/04842 348/14.03 |
| 2016/0299672 A1 | 10/2016 | Lindenberg et al. | |
| 2019/0268174 A1 | 8/2019 | Szeredi et al. | |
| 2021/0352244 A1 | 11/2021 | Benedetto et al. | |
| 2021/0368134 A1 | 11/2021 | Rajamani et al. | |

OTHER PUBLICATIONS

Zoom, Zoom: Breakout Rooms (Faculty/Hosts), Apr. 18, 2017, kb.siue.edu, https://kb.siue.edu/page.php?id=72679 (Year: 2017).*
Christoph Janz, "Bringing the cocktail effect to video meetings." https://medium.com/point-nine-news/bringing-the-cocktail-effect-to-video-meetings-3eb717b05d39, Jul. 7, 2020, 8 pages.
Iotum, Breakout Rooms: Use Breakout Rooms to connect on a more personal level in a virtual space, https://www.freeconference.com/feature/breakout-rooms/, May 11, 2021, 7 pages.
Zoom, "How to use Breakout Rooms in Zoom," https://www.youtube.com/watch?v=jbPpdyn16sY, Mar. 20, 2020, 3 pages.
The Tech Catalyst, "Webex Breakout Sessions / Webex Breakout Rooms—How To and Demo," 2 pages, Sep. 9, 2020.
Michael Muchmore, "Zoom Alternatives: Best Free Group Video Calling Services for 2022," https://www.pcmag.com/picks/zoom-alternatives-best-free-services-for-group-video-chatting-during-the, 10 pages, PCMag, Dec. 29, 2021.

* cited by examiner

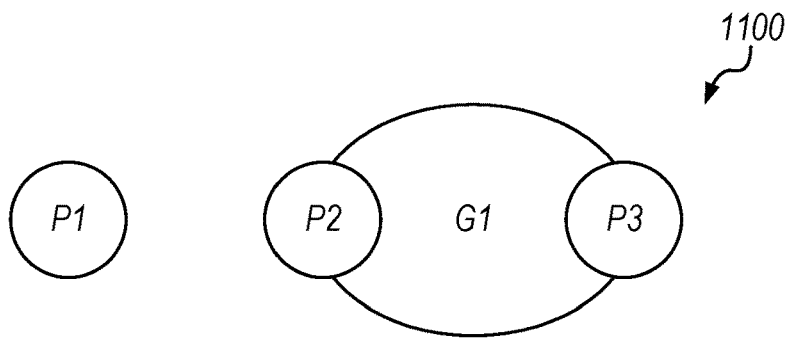
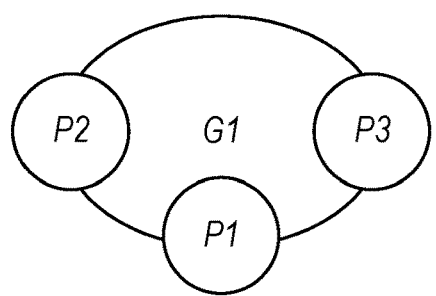
Fig. 11A
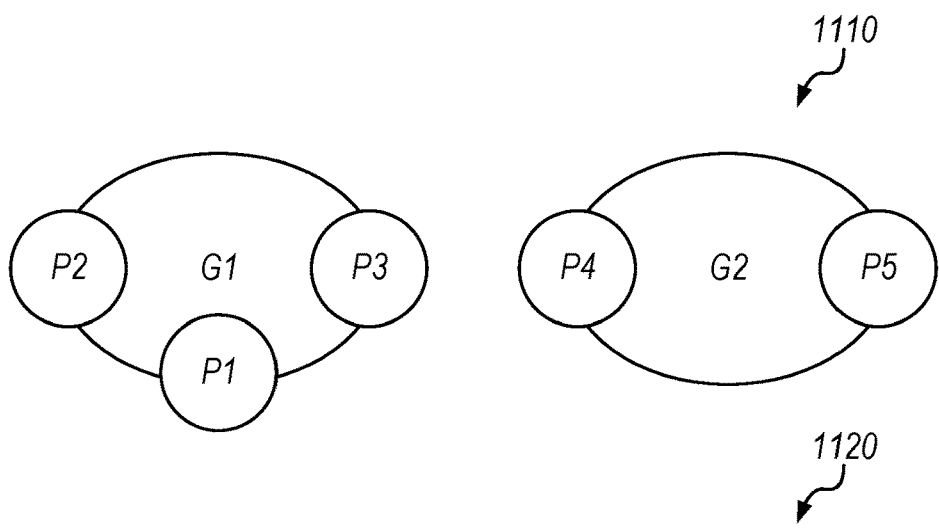
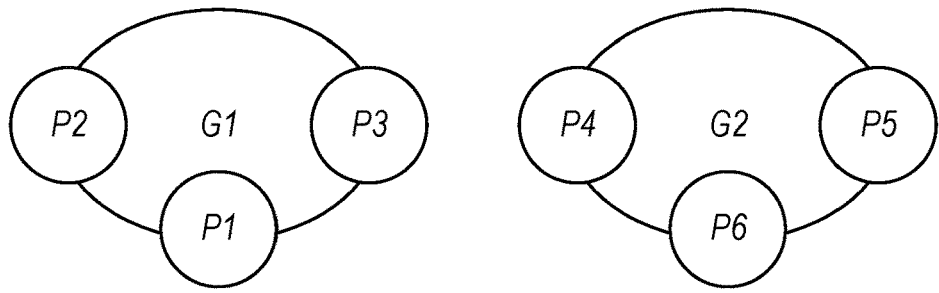
Fig. 11B

Richard Foxnick (53, ♂ , 🇬🇧 , 💳 )

Last event attended together: Maggie's Birthday (2020-07-07)
Last email exchange: Company Social (2020-07014)
Last DM received: "Are you going to company social?" (2020-07013)
Last DM sent: "Be there or be square!" (2020-07013)
Shared interests: basketball, football.
Shared location: Croatia, Jamaica, France LinkedIn bio: Managing Partner & CIO @ 256 Capital Partners. Venture Partner @ Virgil Capital. Previously co-Founder @ Textbook Ventures.

Facebook bio: Just passing by to the next

Fig. 13

ALTERATION OF EVENT USER
INTERFACES OF AN ONLINE
CONFERENCING SERVICE

PRIORITY CLAIM

The present application claims priority to U.S. Provisional Application No. 63,061,576, filed Aug. 5, 2020 and U.S. Provisional Application No. 63,180,342, filed Apr. 27, 2021, which are both incorporated by reference herein in their entirety.

BACKGROUND

Technical Field

This disclosure relates generally to a platform for processing online interactions between users, including techniques that mimic interactions that would occur between users in an in-person setting.

Description of the Related Art

Last year, consumers and businesses in the United States spent upwards of $113 billion dollars on in-person events, such as face-to-face meetings, conventions, and the like. Due to recent social distancing measures, many of these events have moved to platforms that permit telephone dial-ins and/or video conferencing.

BRIEF DESCRIPTION OF THE DRAWINGS

FIGS. 11A-11C are diagrams illustrating examples of users joining and leaving sub-groups, according to some embodiments.

FIG. 13 is a diagram illustrating example participant information (PI), according to some embodiments.

DETAILED DESCRIPTION

There has been a recent proliferation in the use of platforms that permit teleconferencing and/or videoconferencing, including for both social and professional interactions. Traditional teleconferencing platforms, however, include various limitations, particularly for facilitating social interactions, and thus a platform is disclosed (which is called TOUCAN in one instantiation) that utilizes techniques that address many of the limitations of existing technologies. These techniques enable natural formation of conversation groups within a larger social event while still allowing participants to remain aware of the larger event. For example, event guests can move in and out of sub-groups of a group of users attending the event at will, in much the same way that individuals routinely do during an in-person event. The disclosed techniques thus recreate and, in some cases, improve on the dynamics of live gatherings of people to provide improved online interaction in both social and professional settings. As used herein, the term "platform" refers to software and an associated ecosystem of resources that facilitate providing a service. In the context of the present disclosure, the service provided by the disclosed platforms is an online conferencing service.

Techniques are disclosed for dynamically altering an event user interface based on content of audio and video feeds of different users attending the event via the disclosed online conferencing service. For example, a server computer system executing the online conferencing services gathers data for an event in real-time (e.g., as a user is speaking, the server gathers real-time event data) and analyzes various aspects of this data in order to alter and update the user interface displayed to a group of users in the event without receiving input from the users of the event requesting user interface updates. Specifically, the disclosed server system analyzes a set of characteristics indicated by the audio feeds or video feeds, or both of various users within an event. The disclosed server system may determine semantics of a conversation occurring within an event (e.g., a particular topic a sub-group of users within the event are discussing). As one specific example, the server system may determine that a sub-group of users within an event are discussing gardening. In this specific example, the server system updated the event user interface to show symbols representing gardening (e.g., a trowel, seeds, flowers, etc.) next to or overlayed on the displayed sub-group.

Example System Architecture

Figure 1:
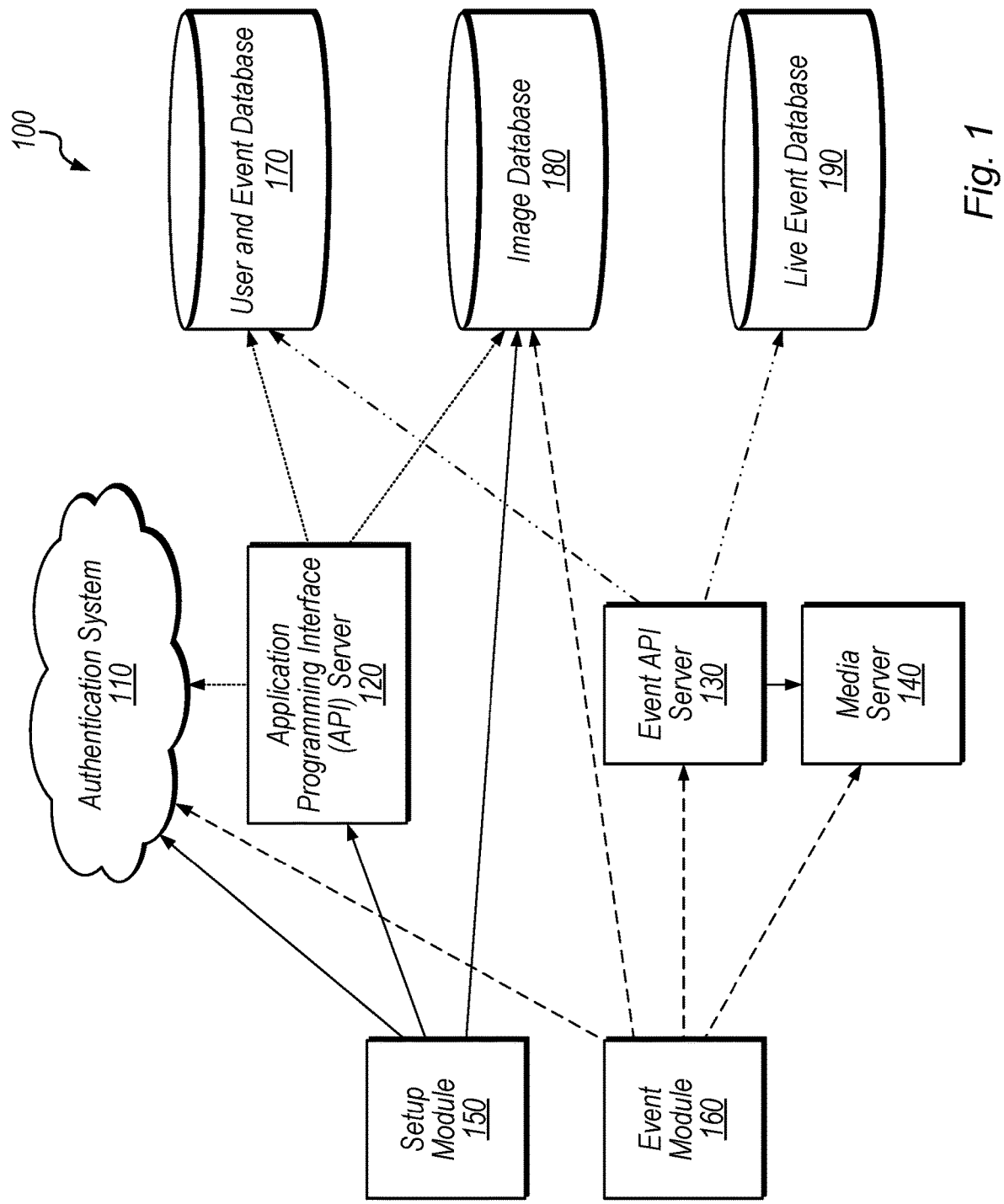
FIG. 1 is a block diagram illustrating an example system configured to execute a conferencing service, according to some embodiments.

FIG. 1 is a block diagram illustrating one embodiment of a computer system configured to implement a conferencing service that permits users to interact online. In the illustrated embodiment, system 100 includes authentication system 110, application programming interface (API) server 120, event API server 130, media server 140, setup module 150, event module 160, user and event database 170, image database 180, and live event database 190. System 100 may also be referred to as a "conferencing platform" or "the platform" throughout this disclosure.

Authentication system 110, in the illustrated embodiment, is a computer system or module that facilitates authentication of users requesting to create, attend, delete, etc. various platform events. A user may be presented with various options for authentication, including FACEBOOK, various GOOGLE authentication services (e.g., GMAIL), etc. for verifying the identity of the user prior to providing them with access to the service.

In this disclosure, various "modules" operable to perform designated functions are shown in the figures and described in detail above (e.g., event module 160, setup module 150, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as "operable" to perform operations refers to a software module, a hardware module, or some combination thereof. Further, for any discussion herein that refers to a module that is "executable" to perform certain operations, it is to be understood that those operations may be implemented, in other embodiments, by a hardware module "configured" to perform the operations, and vice versa.

Setup module 150, in the illustrated embodiment, is software that is executable to provide an interface to users for interacting with the conferencing platform. This module may interact with servers of various different authentication systems (such as authentication system 110) for users attempting to sign up or sign in to the platform in order to attend an event. In some embodiments, setup module 150 is a browser-based application that allows users to manage their profiles and view or edit events. For example, a user may generate a networking event, a birthday party, a happy hour, etc. via setup module 150 and invite various users to join the event. Setup module 150 facilitates initial setup and scheduling of events, while another module, such as event module 160, may facilitate active or "live" events, including live audio and/or video feeds for various users attending events. The disclosed conferencing service supports users having video and/or audio feeds.

Event module 160 is software that executes on the client side (on a client computing device) to allow users to participate in an online event generated via setup module 150. Module 160 may thus run as part of a browser, as an application on a mobile device, etc. Consequently, various instances of event module 160 may be implemented for various different users participating in an event. Event module 160 indicates various users attending an event using some form of representation (e.g., an avatar of the user, photograph of the user, live video feed of the user, etc.) depending on the context within the event. For example, a user that is attending an event, but who has not yet joined a sub-group in the event may be represented using a photograph, while a user that has joined a sub-group may be represented with a live video feed within the group. Event module 160 may use a device camera and microphone of the device of a user to send audio and video data to media server 140. Audio and video streams from various users may also be displayed via event module 160 such that the user utilizing event module 160 can interact with these users. Various other types of interactions may also be facilitated via event module 160 as discussed in further detail below.

API server 120, in the illustrated embodiment, handles requests for user authentication, user profile management, and event management. For example, API server 120 may facilitate user authentication via one or more authentication systems (e.g., via authentication system 110). API server 120 may be used by setup module 150 to process event management requests. That is, API server 120 and setup module 150 may work together in a client-server relationship. This server may perform various administrative tasks in addition to handling authentication requests. API server 120 accesses user and event database 170 and image database 180 to satisfy such requests. API server 120 may be a hypertext transfer protocol (HTTP)-based server, for example.

Event API server 130, in the illustrated embodiment, handles requests during a live event. For example, users may request to enter or exit an event, mute or unmute their audio or video, change their camera frame size, send messages (text, icons, images, etc.), join or leave various sub-groups within the event, etc. In addition, event API server 130 may notify users of voice activity during an event. This server manages connecting and disconnecting audio and video streams on media server 140, for example. Event API server 130 may also be an HTTP-based server, Web Socket-based server, etc.

Media server 140 manages connections and routing of audio and video streams between various endpoints. Media server 140 may be any of various types of open or closed-source servers operable to manage web real-time communications (RTC) connections. As one specific example, media server 140 may be a KURENTO media server. Media server 140 may maintain various connections between user devices participating in an event. Media server 140 receives audio, video, and data streams from instances of event module 160. Media server 140 performs any necessary re-encoding, processing, mixing and/or compositing of media and then sends processed streams of media to other event module 160 instances. The media is transferred using real-time transport protocol (RTP). In some embodiments, media server 140 records and stores audio, video, and data streams for different events within live event database 190. For example, a real-time audio recording of a plurality of sub-groups of a group of users attending a given event may be stored in live event database 190.

User and event database 170 stores various data for users, events, and attendee data for users actively attending an event. This database may be an open-source document-based data store. For example, event database 170 may store a document that is an event record containing a unique identifier, name, description, start and end date/time, and various other settings for an event. As one specific example, event database 170 may be managed by a MONGODB server. This database may be used to store structured document records in JavaScript Object Notation (JSON) format. This may provide a system of records for users, events, and attendees.

Image database 180 stores images for users and events. For example, these images may include avatars, background images, video snapshots, etc. of various users attending an event. This database may be a fault-tolerant key-value store with an HTTP interface provided by AMAZON WEB SERVICES (AWS), for example. This key-value store is able to handle large objects of various types of data and may serve such data directly to a client application (e.g., event module 160). Live event database 190 stores live event state data for users in an event, users within various conversation groups within the event, etc. This live event data may be stored and accessed in real-time, allowing the disclosed platform to manipulate event data during an event as well as maintain a current state of the event. This database is managed by an open-source, memory-based data structure server. As one specific example, live event database 190 may be a REDIS database. The various different types of databases used by the conferencing platform may provide various different performance characteristics.

In one embodiment, upon joining an event facilitated by the disclosed conferencing platform, some representation of the user appears on the user interface that is shown to the conference participants. This representation may be an avatar of a user that is "floating" within a background of the event user interface. The event user interface may have a solid-colored background or may have a wallpaper that is appropriately themed for the event (e.g., a beach scene for a happy hour, confetti and balloons for a birthday party, etc.). This user is able to see icons representing various other users also attending the event and may freely navigate around the user interface of the event. If this user wants to create a sub-group from a group of users attending an event to begin talking, they simply click on the icon of another user and the platform joins these users and implements live audio and video feeds for these users (assuming their devices allow and are enabled for these two features).

Figure 15B:
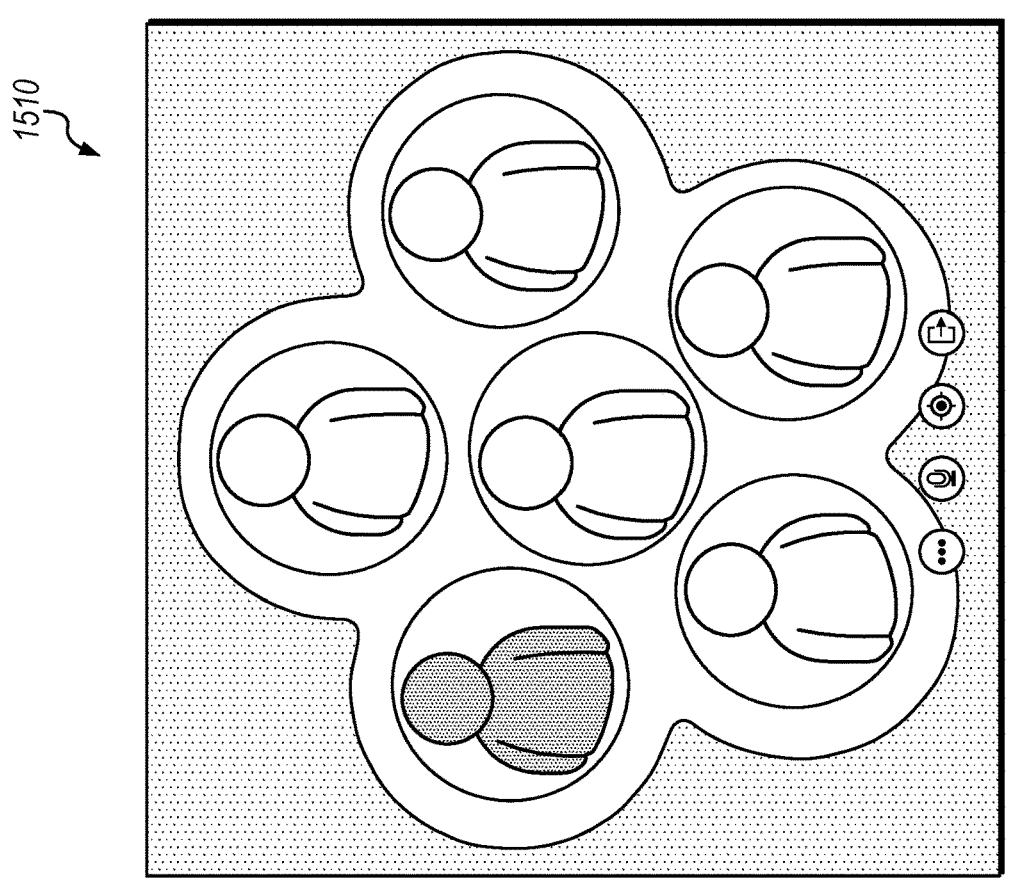
FIGS. 15A and 15B are diagrams illustrating example user interfaces displaying different sub-groups, according to some embodiments.
Figure 15A:
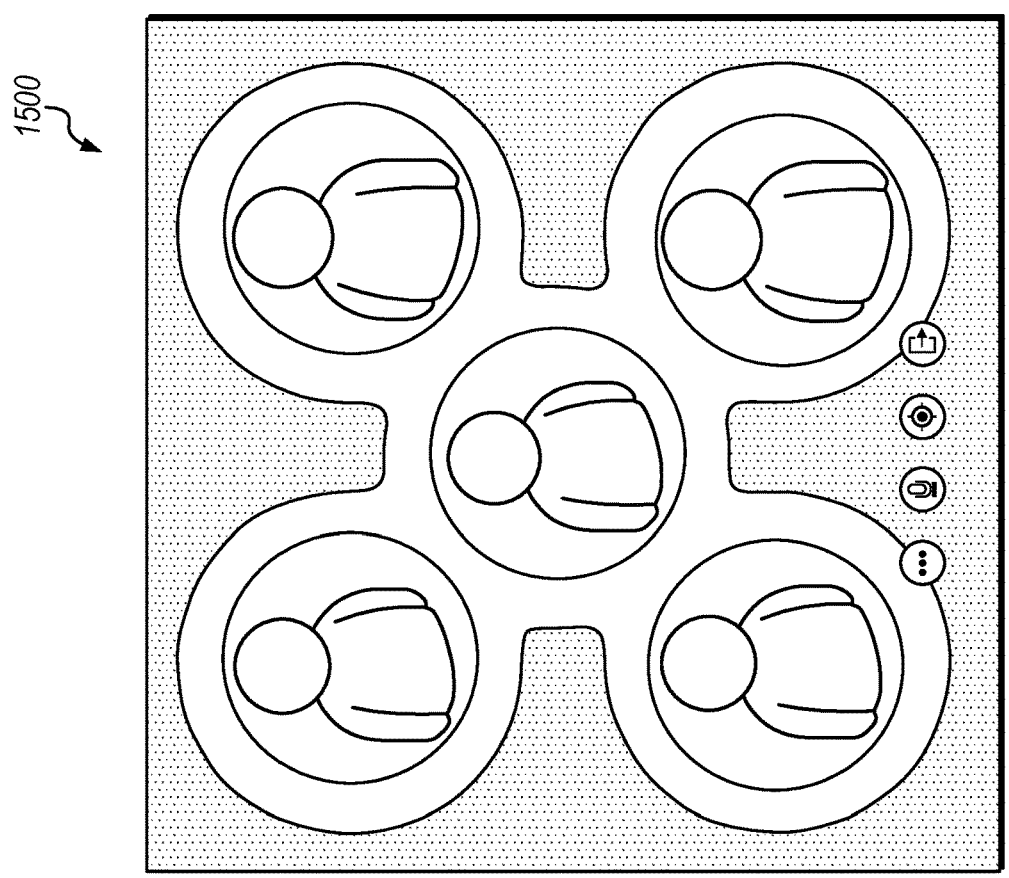

Once they have joined a sub-group with at least one other user, a given user is able to converse in real-time with various users in the sub-group as well as utilize various other features provided by the conferencing platform and discussed in detail herein. In some situations, when the user joins the event, other users may have already created a sub-group. The user is then able to hover over the created sub-group and select the "join" button that appears. FIGS. 15A and 15B, discussed in detail below, provide examples of user interfaces displayed to users that have joined a sub-group. The disclosed conferencing platform allows dynamic formation and dissolution of sub-groups within an event, without requiring administrative privileges to do so. For example, any subset of users attending an event may form, join, or leave sub-groups at will without requiring approval by an administrative user. This flexibility allows interactions to occur more fluidly via the conferencing platform, more closely approximating the social dynamics of in-person events.

Although several combinations of the plethora of disclosed embodiments are discussed herein, any of various combinations or sub-combinations of the disclosed embodiments may be contemplated. For example, the embodiments discussed herein with reference to FIG. 2 may be combined with the embodiments discussed herein with reference to FIG. 3, as one non-limiting example.

Figure 3:
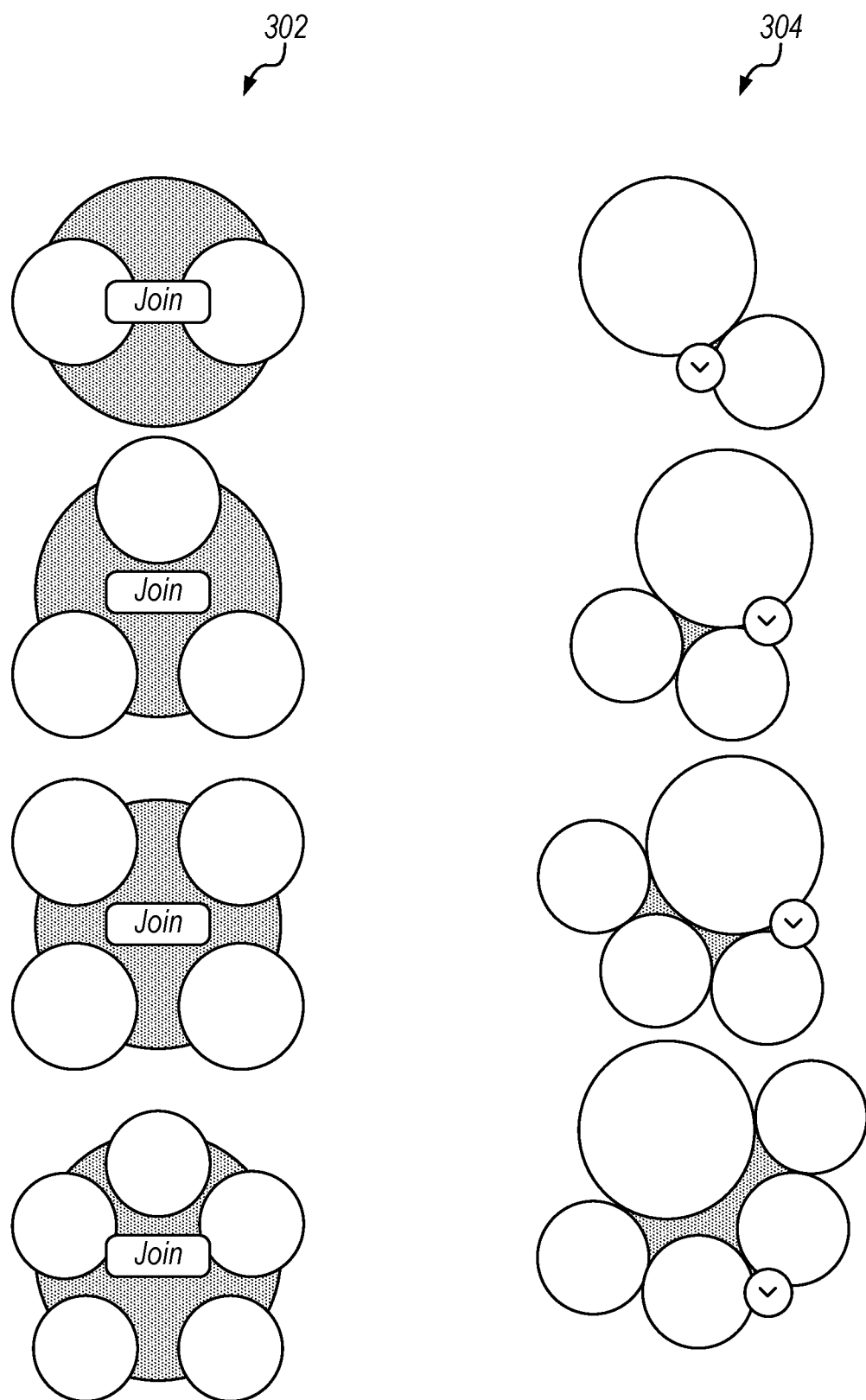
FIG. 3 is a diagram illustrating example conversation groups, according to some embodiments.
Figure 4:
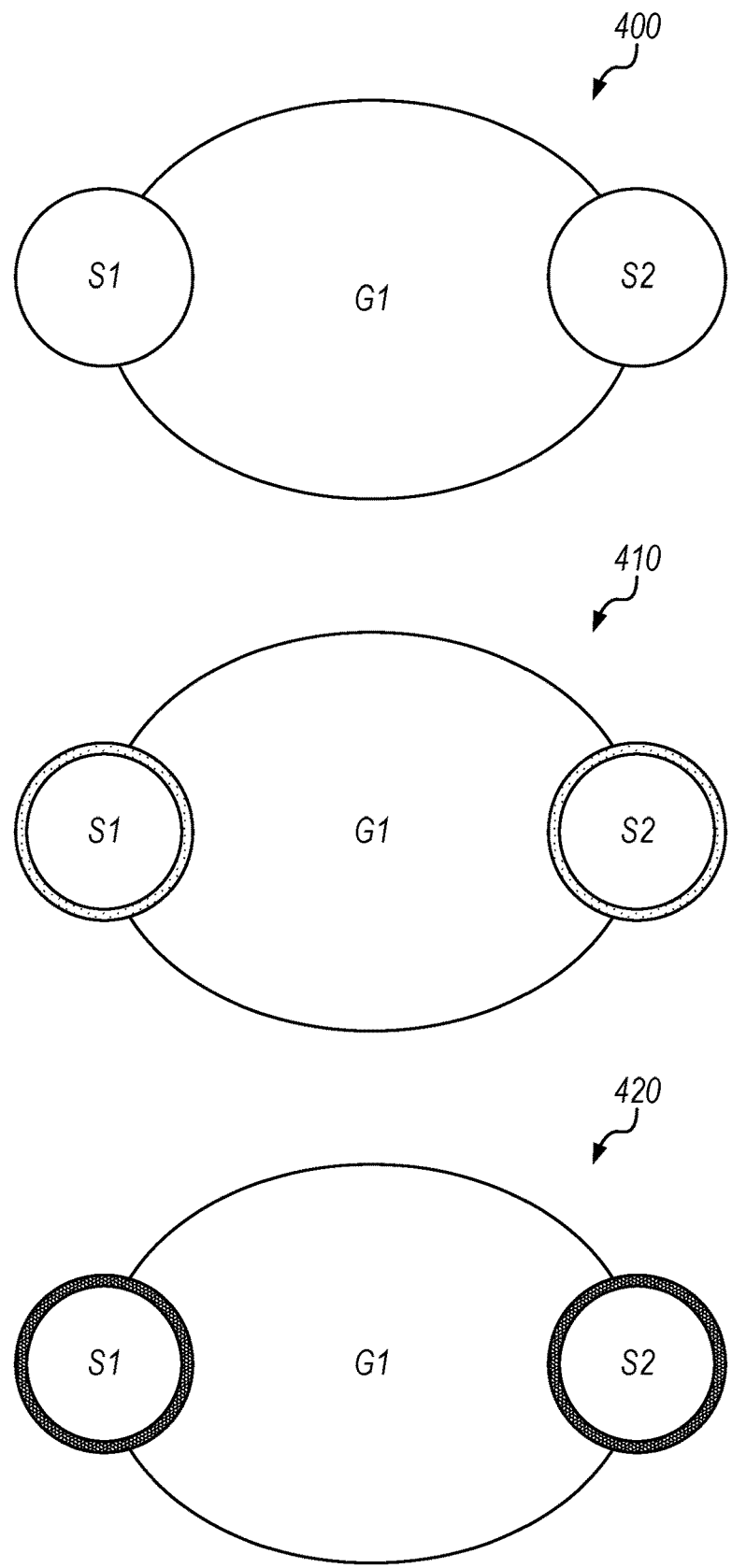
FIG. 4 is a diagram illustrating example indications of crosstalk, according to some embodiments.
Figure 5:
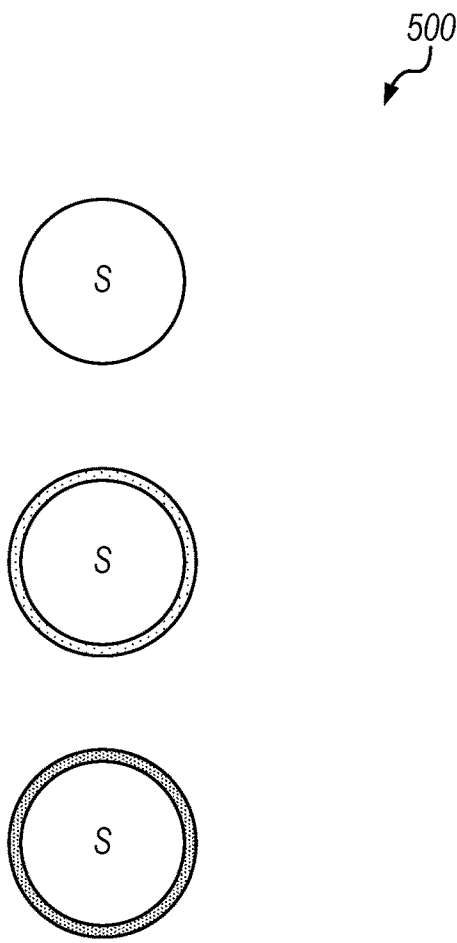
FIG. 5 is a diagram illustrating example indications of speaker characteristics, according to some embodiments.
Figure 6A:
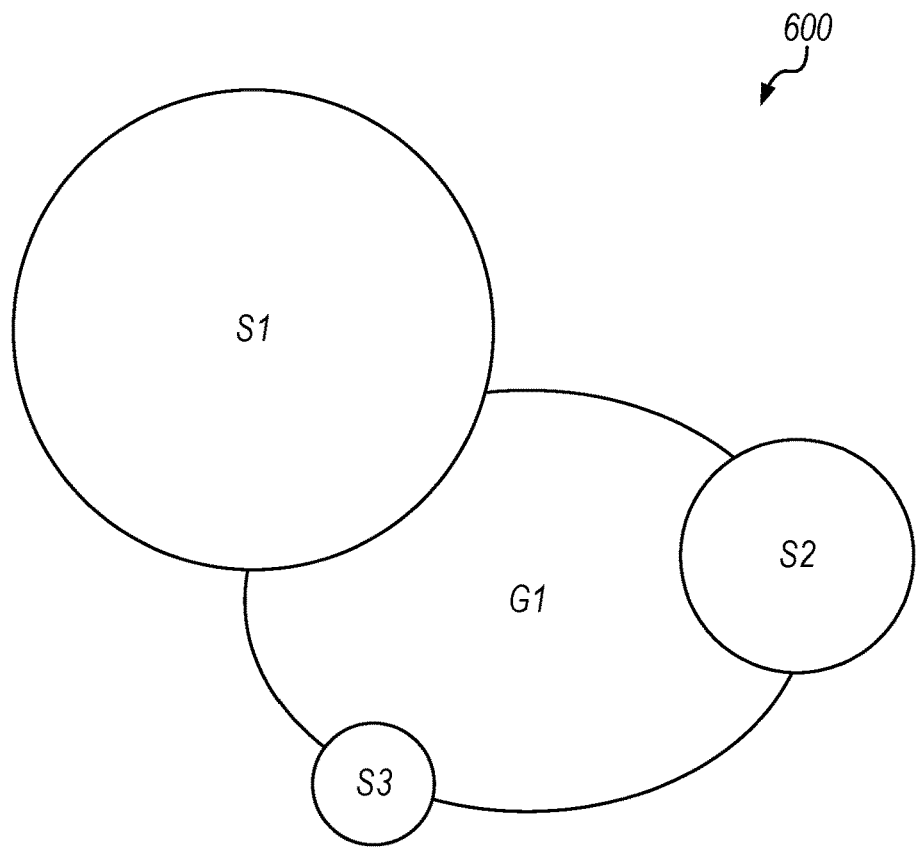
FIGS. 6A and 6B are diagrams illustrating example indications of speaking time, according to some embodiments.
Figure 6B:
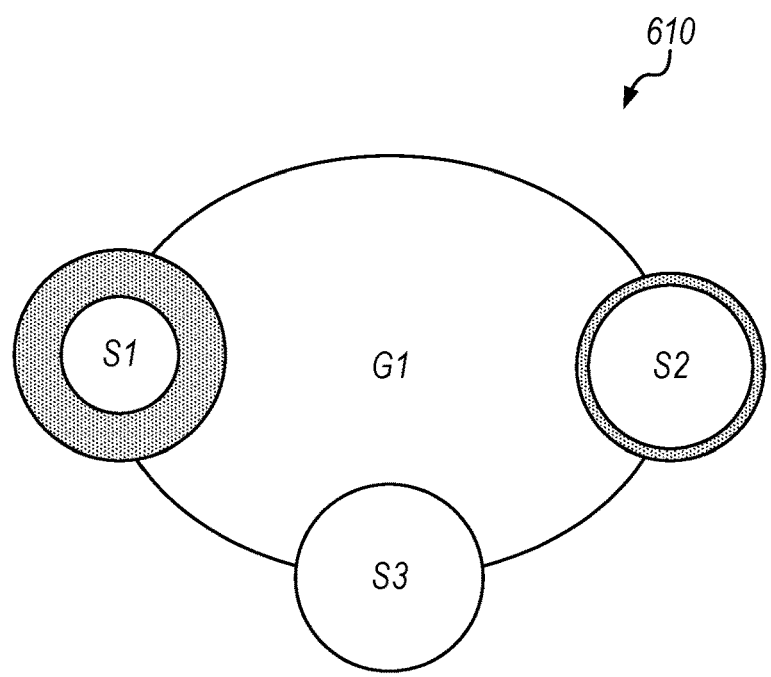

In various embodiments, the disclosed online conferencing platform is configured to alter various aspects of an event user interface real-time with execution of the event based on different things occurring within the event. For example, real-time alteration of an event user interface may be based on various different characteristics included in content of audio and video feeds for users within an event such as which user is currently active (e.g., speaking), speaking time of different users (e.g., how long has a given user been speaking), speaking volume of different users, devices utilized by different users to access an event (e.g., screen size of user devices, memory availability of the devices, etc.), user distraction (is a user primarily focusing on their own video feed or the video feeds of other users in the event), semantics of conversations within the event (e.g., what is a given sub-group of a group of users within an event discussing?), etc. In some embodiments, the disclosed alteration of a live event user interface is based on different user's active participation in an event and is not based on particular commands or preferences received from users attending the event. For example, the alteration of an event is based on the characteristics of event data such as the audio feeds and video feeds of users in an event. For example, FIG. 2 illustrates alteration of an event user interface (displaying symbols) based on analyzing audio and video feeds to determine conversation semantics, FIG. 3 illustrates alteration of an event user interface (altering video feed sizing) based on analyzing e.g., user distraction or screen size of user computing devices, FIG. 4 illustrates alteration of an event user interface (altering users' video feeds) based on analyzing audio and video feeds of users e.g., to determine whether crosstalk is occurring, FIG. 5 illustrate alteration of an event interface (altering animations around a user's video feed) based on determining user emotion, FIGS. 6A and 6B illustrate alteration of an event interface (altering the sizing, shape, shading, etc. of a user's video feed) based on speaking time of users.

Symbolic Representation

Figure 2:
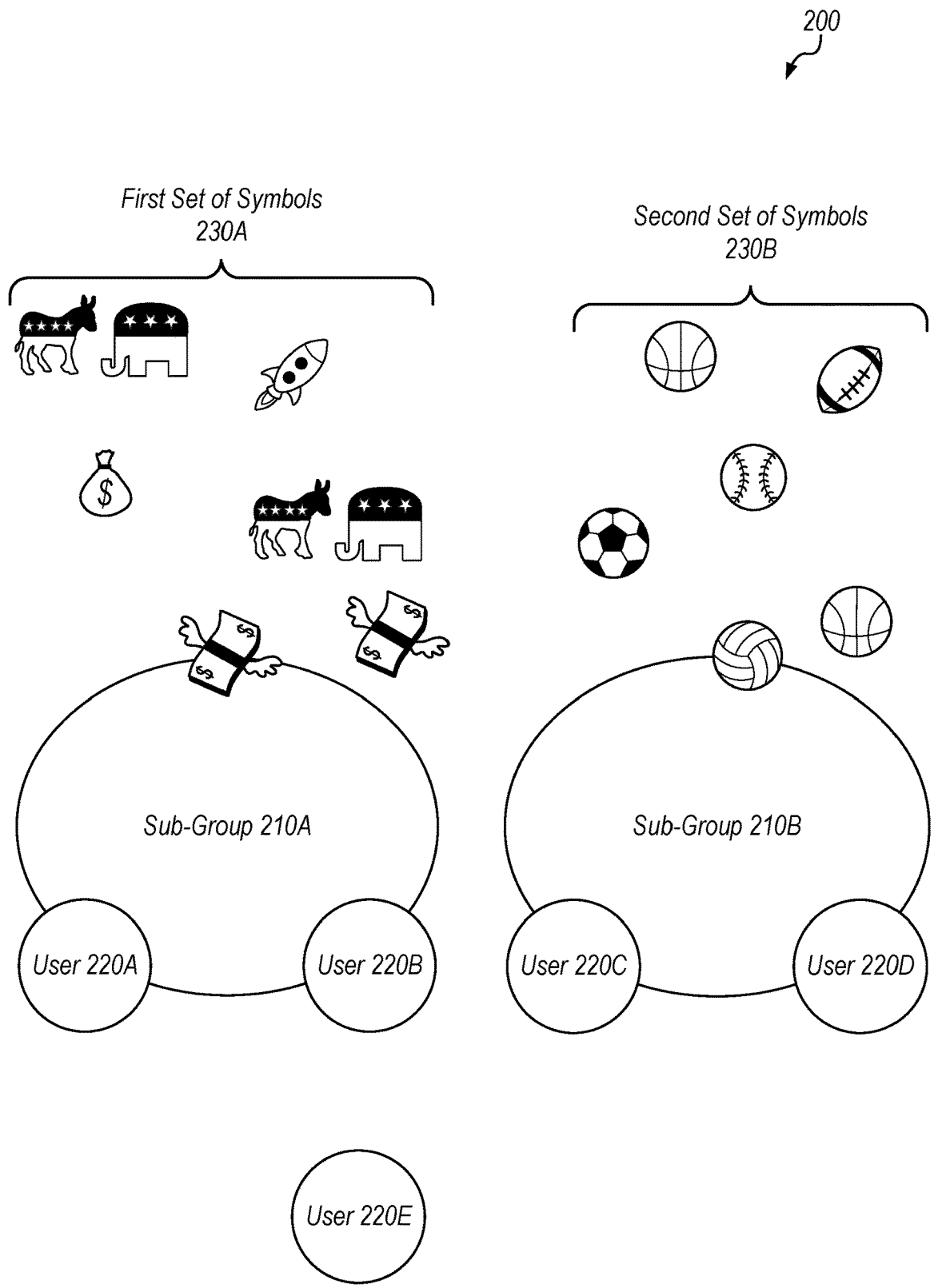
FIG. 2 is a diagram illustrating example symbolic representation of group conversations, according to some embodiments.

Turning now to FIG. 2, an event user interface 200 is shown with two different sub-groups 210A and 210B of a group of users attending an event facilitated by conferencing system 100 shown in FIG. 1, for example. In the illustrated embodiment, sub-group 210A includes users 220A and 220B, while sub-group 210B includes users 220C and 220D. User 220D is not included in a sub-group within event user interface 200. In order to interact with one or more of users 220A-220D, user 220E may request to join one or both of sub-group 210A or 210B.

In the illustrated embodiment, sub-group 210A is shown with a first set of symbols 230A representing the content of a conversation taking place in this sub-group (e.g., politics). These symbols are visible to users outside of sub-group 210A (such as user 220E) and are shown overlayed and above the portion of event user interface 200 displaying sub-group 210A to users outside the group. In some embodiments, both users outside of sub-group 210A and users within sub-group 210A are able to see the set first set of symbols 230A. For example, in some situations, only users outside of sub-group 210A such as user 220E may be able to see the first set of symbols 230A (or second set of symbols 230B, or both). In other situations, users in sub-group 210A and user 220E are able to see first set of symbols 230A. Similarly, sub-group 210B is shown with a second set of symbols 230B representing equipment from different types of sports to indicate that the topic of conversation in sub-group 210B is focused on sports. Although symbols are discussed herein as representing conversation topics of sub-groups, any of various other types of user interface elements may be used to represent the meaning of a sub-group conversation. For example, images, icons, text, or any combination thereof may be used to represent a topic of conversation associated with a given sub-group.

The two different sets of symbols 230A and 230B shown in FIG. 2 may advantageously provide users outside of sub-group 210B with context for conversations occurring in the sub-group, which may affect their decision of whether to join one of these sub-groups. For example, if user 220E is an avid sports fan and sees that sub-group 210B is discussing sports, user 220E is likely to request to join this sub-group 210B rather than sub-group 210A. If the symbolic representation of sub-group conversations was not shown to user 220E, this user might waste time joining a sub-group discussing a topic that is not of interest to user 220E. The symbolic representation shown in FIG. 2 attempts to mimic the situation in which a person may hear snippets of conversation at a physical party they are attending. These snippets of conversation may influence a person's decision to join one conversation over another.

In some embodiments, the displayed event user interface 200 shown in FIG. 2 includes an indication of a video feed of at least one user in the group of users that is currently active. For example, in addition to showing the two sub-groups 210A and 210B, conferencing system 100 may cause display of an indication of a video feed of user 220A showing that this user is actively speaking. Then, while this indication is still being shown to indicate this user is speaking, the conferencing system 100 may alter one or more aspects of the displayed event user interface 200 (e.g., display various symbols representing a conversation within sub-group 210A).

The symbols displayed in FIG. 2 may be generated by transcribing the content of audio channels included in an event in real time. For example, while users 220A and 220B are discussing politics, the audio recording of their discussion is being transcribed and analyzed by event API server 130. Event API server 130 extracts keywords and topics from the transcript of the audio streams and maps these keywords and topics to one or more images (e.g., symbols). Event API server 130 may analyze the transcripts of live audio streams by utilizing natural language processing (NLP) techniques, such as one or more of the following techniques: keyword extraction, named entity recognition, sentiment analysis, aspect mining, text summarization, topic modeling, etc. The disclosed natural language processing may be implemented using various statistical model generation algorithms or machine learning models, such as a neural network.

The server then maps output of a natural language analysis to symbols stored in a symbol database (e.g., live event database 190), where each symbol is indexed by its related keyword(s), named entities, topics, sentences, etc. A combination of the information indexed in the symbol database (e.g., a lexical database) may provide context to the server when it is performing symbol matching. For example, when symbols are used to represent keywords and named entities, the extracted topic may also be used to select a best matching symbol to represent a given keyword or named entity.

Keywords are one example of characteristics that may be determined from content of audio feeds. As one specific example, event API server 130 may extract the keywords "mortgage," "price," and "spike" and then determine based on these keywords that users in a given event are discussing the topic of "real estate" (buying and selling homes). As a result, event API server 130 may map the term "mortgage" to a document symbol, the term "price" to a money symbol, and the term "spike" to an arrow pointing in an upward direction. In this case, the topic of "real estate" informs the selection of the symbol for the keyword "spike." If instead, the topic of conversation were "volleyball," a different symbol would be selected by the server. Similarly, named entities such as famous individuals, places, products, etc. may be extracted by the event API server 130 and mapped to corresponding images. As another example, symbols can be chosen for topics in general using the same symbol-mapping database. In another example, event API server 130 determines the topic of conversation in an event is "baseball" and symbols for a bat and a baseball are selected and displayed to users in the event.

In some embodiments, event API server 130 uses data stored in the symbol database as well as a larger text corpus to train a machine learning model, such as a neural network, to match text transcripts directly to symbols. In some embodiments, event API server 130 analyzes audio channels of all sub-groups within an event. In some embodiments, event API server 130 analyzes an audio channel of a single user within a sub-group of an event. For example, if only one user is speaking within a sub-group, event API server 130 might only transcribe this user's audio channel.

Figure 12A:
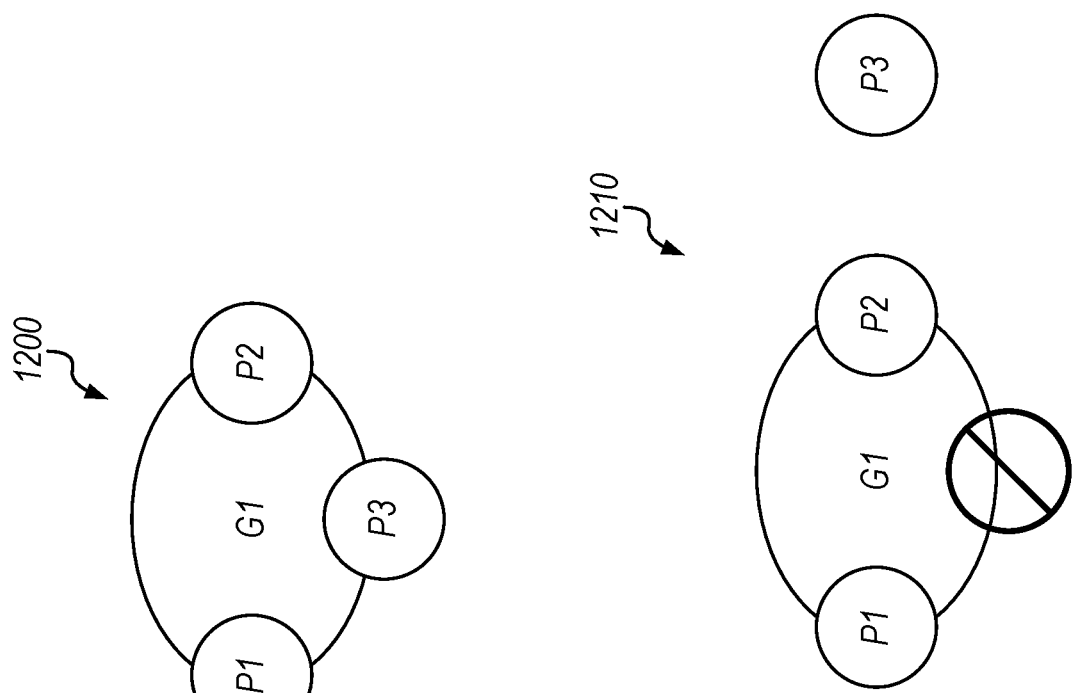
FIGS. 12A and 12B are diagrams illustrating example private sub-groups, according to some embodiments.
Figure 12B:
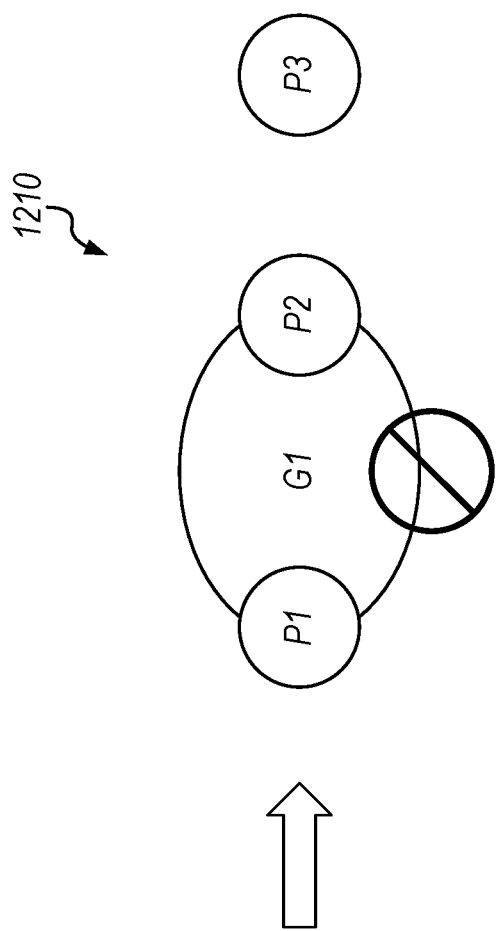

While representing conversations within an event using different forms of user interface elements may advantageously allow users to easily navigate and determine which conversations to join, representing a conversation with either a transcript, a summary, a word cloud showing a transcript, etc. might expose private information. For example, users 220A and 220B within sub-group 210A may be discussing a sensitive information. Due to the derivative nature of the symbolic representations, however, the symbols 230A representing the conversation of sub-group 210A may avoid violating the privacy of the conversation of users 220A and 220B. For example, while first set of symbols 230A shows that users 220A and 220B are discussing politics, these symbols do not reveal the precise dialog of the users of sub-group 210A, thereby protecting the privacy of the conversation within sub-group 210A. In this example, sub-group 210A may be a private sub-group that users outside of the group (e.g., user 220E) need to request permission to join before they are admitted. FIGS. 12A and 12B discussed in detail below illustrate a do not disturb feature for facilitating private interactions.

The disclosed display of symbols, speech recognition, and natural language processing may be performed by event module 160. In some embodiments, a portion (or all) of NLP or speech recognition, or both are performed by an entity other than event module 160, such as event API server 130 or media server 140, or some other API (not shown in FIG. 1). The event API server 130 may distribute the symbol data to user computing devices of various users attending events for display to these users via user interfaces of their computing devices.

In some embodiments, event API server 130 distributes notifications that include symbol data to various participants of an event when the substance of certain conversations occurring within the event are relevant to them (e.g., based on their personal information (PI) panel such as the PI panel 1300 shown in FIG. 13). For example, if users 220C and 220D are discussing sports and event module 160 identifies that user 220E is interested in sports (based on their PI panel), then module 160 instructs event API server 130 to send a notification to user 220E indicating that they might be interested in joining sub-group 210B.

Sizing of Feeds Within Conversation Groups

FIG. 3 is a diagram illustrating example conversation groups within a user interface for an event. A "conversation group" is simply a label for referring to a sub-group of users within a larger group of users within an event. In the illustrated embodiment, example 302 illustrates a layout in which each feed within a conversation group has the same size. Example 304, in contrast, illustrates a paradigm in which video feeds for each user within a conversation group have different sizes. For example, the video feeds in example 304 may be continuously altered during an event based on various aspects of the event. As one specific example, the video feed of a given user within a sub-group may be altered five different times to increase its size during an event based on this user speaking more than other users within the sub-group.

In some cases, sizing of video feeds can be done automatically in response to user behavior or characteristics, as well as in response to other user's preferences for sizing. For example, users' video feeds may be dynamically resized based on current behavior of these users within a conversation group. In other cases, the video feeds of users may be resized one or more times based on past behavior of these users. In still other cases, the resizing can be performed one or more times in a given conversation group based on one or more users specifying different sizes in which they would like the video feeds (either their own or the feeds of other users in the group) to appear. As one specific example, if a particular user within a sub-group is giving a 30-minute presentation, during this user's presentation, the size of the particular user's video feed may be continuously increased. Further in this example, the particular user's video feed may be shown twice as large as other user's video feeds in the sub-group based on this user selecting to share their screen (e.g., indicating they are about to present). In still other cases, video feed resizing is performed based on a user's screen size. For example, a user accessing an event via their mobile phone might be shown an interface similar to example 304, while a user accessing an event via their desktop computer might be shown an interface similar to example 302.

In example 302, each user within a conversation group appears within a live video feed that is the same size as other users in the group. This type of interface may cause users to devote roughly equal visual consideration to each member of the sub-group regardless of that person's participation in the sub-group. This approach, however, does not correspond to the typical actions of groups of people speaking to one another face-to-face. To facilitate a more realistic interaction, such as a face-to-face interaction, the disclosed techniques may display video feeds of users that have different sizes. In an in-person setting, people may move closer to some people in a group and farther away from others. Individuals interacting in an in-person group may tend to focus on a single person in the group, particularly a speaker who is highly active in a conversation.

Similar to in-person meetings, the dynamic layout 304 illustrated in FIG. 3 attempts to, either automatically or via user input, control which users get more or less visual attention. In some situations, a user may specify sizes for other users in their conversation group. In other situations, the sizing of users' video feeds is performed automatically by the event software. In the first case, the disclosed techniques allow users within a group to enlarge, shrink, or hide their view of other user's videos which may or may not alter how other users view these videos. In some situations, if one user shrinks the video feed of another user in a sub-group, all other users within that sub-group will see the video feed of the other user shrink as well. Similarly, users may be allowed to enlarge, shrink, or hide their own video feed within a sub-group. In some embodiments, changes to the size of video feeds made by individual users may be implemented gradually, such that the changes in size are almost imperceptible to the users. In the second case, the event software may automatically size the feeds of different users based on their behaviors (past, present, or both) or their characteristics.

In some embodiments, the dynamic layout alters the size of users' video feeds based on their audio activity. For example, if a first user is speaking 75% of the time a sub-group has been formed, the disclosed techniques may slowly begin increasing the size of the first user's video feed. FIGS. 6A and 6B discussed in detail below illustrated further examples of video feed resizing. In addition, as the first user's video feed is increasing in size, the video feeds of other users may begin to shrink, particularly for user's who are not speaking. Such changes to user's video feeds may be temporal in nature, such that they dynamically change with the length of time a given sub-group has been formed. In other embodiments, the size of different video feeds within a sub-group may be based on one or more of a number of common interests, skills, experiences, locations, etc. that two or more user's share.

Figure 9:
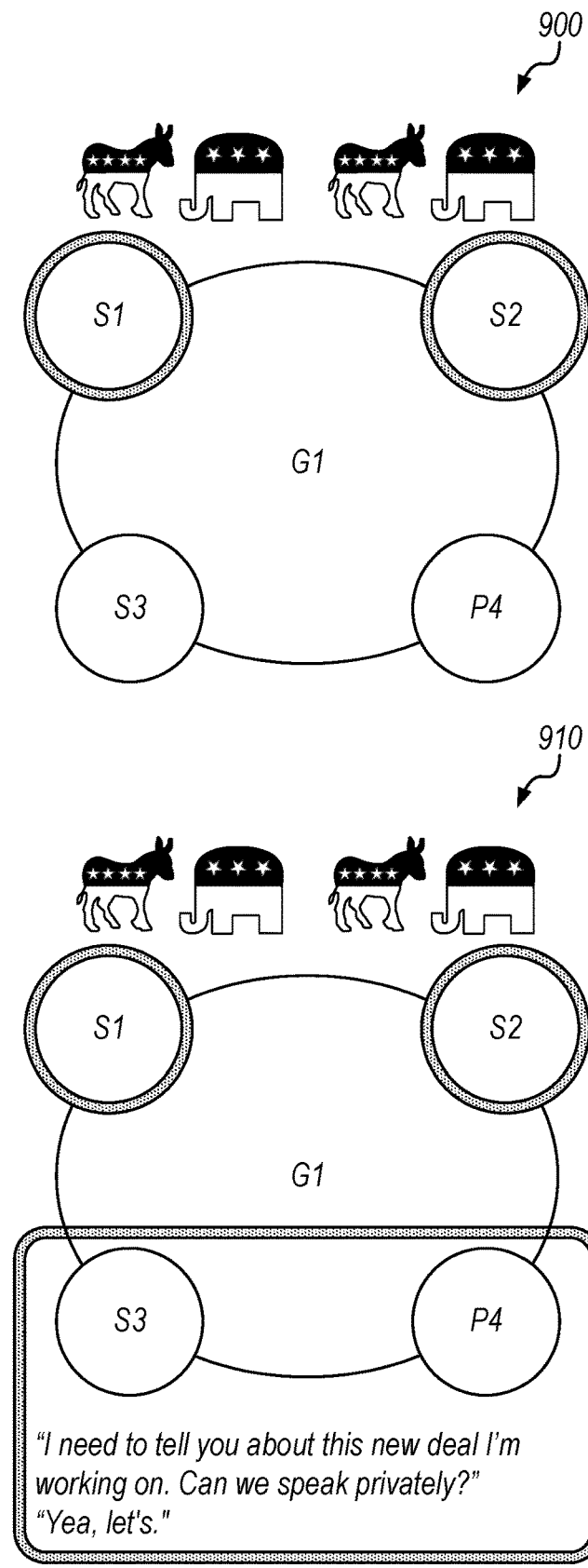
FIG. 9 is a diagram illustrating an example private conversation, according to some embodiments.

In some embodiments, the automatic sizing of video feeds may be based on an amount of time or a number of times, or both that two users have interacted with one another at one or more events. In some embodiments, the type of conversation being had influences the size of video feeds. For example, if two or more users are participating in private conversations within a sub-group, these users may be represented to each other using large circles, but may appear as small circles to other users within the sub-group (not participating in the private conversation). As one specific example, a first user that is actively speaking in a sub-group may be displayed with a large square, while second and third users that are not speaking are displayed with slightly smaller square. Further in this specific example, fourth and fifth users that are participating in a private conversation within the sub-group (as depicted in FIG. 9 and discussed in detail below) are displayed with even small circles.

The layout illustrated in example 304 is more space-efficient than the layout shown in example 302. For example, the dynamic layout advantageously reduces whitespace between the video feeds of users in a sub-group. This efficient use of space provided by dynamic layout 304 may advantageously improve a user's experience when attending an event, particularly when the user is utilizing a mobile phone (or another type of device with a small interface) to attend the event. In some situations, the automatic resizing of user's video feeds may advantageously improve the functionality of a user's computing device (e.g., decreasing the size of user's video feeds may free up computing resources that can be used for other computing needs such as improving the frames per second displayed to the user of the user computing device during an event). In some embodiments, the layout with different sized feeds allows viewers to control how prominent different users appear within their sub-group. In some embodiments, the layout with different sized feeds provides visual feedback of various aspects of a sub-group's conversation. For example, the size, shape, opacity, etc. of different users' video feeds may be altered based on various characteristics of users such as those discussed below with reference to FIGS. 6A and 6B.

Note that, although two different sizes of video feeds are illustrated in example 304, any of various different sizes may be used to display video feeds of various users within a given sub-group of an event. For example, a first user in a given sub-group might have a large bubble displaying their live video feed, a second user in the sub-group might have a bubble that is slightly smaller than the first user, and a third user in the sub-group might have a bubble that is even smaller than the second user. Further, any of various geometric shapes (e.g., circles, squares, rectangles, diamonds, etc.) may be used to represent live video feeds of users attending an event.

In some embodiments, two speakers included in a group within an event may speak at the same time. This "crosstalk" may result in information being lost or misunderstood. During face-to-face conversations when two people begin talking at the same time, one usually says "sorry, you go ahead" and the other speaker continues the conversation. In an online conferencing environment, there may not be natural indications of crosstalk, so users may not realize they are talking over one another. For example, in many conferencing services, if one user is speaking, they may not be able to hear the audio of another speaker. Due to the potential loss of information, the disclosed techniques notify the users of a group when crosstalk is occurring in order to improve communications. Based on such notifications, users may choose to repeat what they said during the crosstalk.

Turning now to FIG. 4, a diagram illustrating example indications of crosstalk is shown. In the illustrated embodiment, diagram 400 shows sub-group G1 with two users S1 and S2 without a shaded encircling because currently there is no crosstalk. For example, either both users are silent or only one of the users is speaking. Diagram 410 shows the same group with both users encircled in a shaded ring to indicate that some amount of crosstalk is occurring. Diagram 420 shows the same group with both users encircled a darker shaded ring than in diagram 410, indicating that both users are actively speaking at the same time. The type of crosstalk indicated in diagram 410 may be referred to as affirmative crosstalk, which includes short utterances including: "uh huh," "yes," "I see," etc. These types of utterances are not intended to interrupt the speaker but are meant to indicate that the listener is engaged with and is paying attention to the speaker. It is unlikely that information would be lost as a result of affirmative crosstalk.

Alternatively, the type of crosstalk indicated in diagram 420 may be referred to as genuine crosstalk and may include situations in which multiple users simultaneously begin talking (e.g., neither speaker knows that the other was about to begin speaking), various users are not actually paying attention to the conversation, audio transmission delay, etc. Consequently, the indications of crosstalk shown in FIG. 4 may assist users in repeating portions of their conversation that may have been lost due to genuine crosstalk. Consider a situation in which one user attending an event compliments another user at the same time that this other user says something, with the result that this other user did not hear the compliment. Without the indication of crosstalk, the first user would not know that the other user did not hear the compliment. In some embodiments, the user interface of a sub-group displays a transcription of the conversations in the sub-group when the conferencing platform detects multiple (i.e., at least two) users are speaking at the same time. Media server 140 processes the timing of audio feeds in a sub-group and determines when and to what extent two audio streams cross. This allows the disclosed platform to provide indications of crosstalk and transcriptions of audio that may have been lost due to crosstalk.

Conversation Dynamics

Turning now to FIG. 5, a diagram is shown illustrating example indications of speaker emotion. Such indications may provide additional context to a virtual interaction. In the illustrated embodiment, diagram 500 includes three different versions of an icon for a user "S." Note that the icons shown in FIG. 5 may also be live video feeds of the user "S." The top icon shows an example in which the user S is not speaking at all, the middle icon shows that user S is speaking softly, while the bottom icon shows that user S is speaking loudly. Specifically, animation around a user's icon or video feed may illustrate that user's speaking volume. These animations may be referred to as decorations. Although FIG. 5 shows speaker emotion using varying shades of a ring around a speaker's icon, volume may be shown with any of various animation techniques and is not limited to the example shown in FIG. 5

In some embodiments, an animation of a speaker's icon indicates that speaker's mood. For example, a decoration indicating mood may be displayed using different sizes, colors, shapes, movement, opacity, thickness, style, etc. As one specific example, the icon of a speaker who is sad or crying may be shown as drooping or with water droplets sliding down the icon. In some situations, it may be useful to alter an icon such that it indicates laughter. For example, if a speaker within a group is telling a joke and other users in the group are laughing, it may be useful for users outside the group to see that people are laughing within this group. In some embodiments, different collective moods for a group are indicated by an icon. For example, if a group icon is indicating that various users within a group are laughing at a particular "intensity," other users may wish to join this group. In some embodiments, event module 160 determines a user's current emotion by analyzing an audio feed of this user. For example, event module 160 may determine that the speaker is frustrated based on the volume of their audio feed increasing as well as the speed at which the speaker is speaking increasing. Event module 160 may perform this determination by tracking a user's speaking volume during an event (e.g., it may be lower at the beginning of an event and then may increase as they become frustrated), by comparing a particular speaker's volume with the speaking volume of other user's recorded during the event, measuring the speed or cadence of a user's speech during an event, etc.

In some embodiments, event module 160 determines a user's current emotion by analyzing a video feed of the user. For example, if a user is smiling in their video feed, event module 160 may determine that this user is happy and may alter their video feed to show a ray of sunshine around this user's video feed. Event module 160 may analyze the user's video feed using computer vision techniques. Module 160 may use computer vision techniques to analyze different user's faces to identify current emotions they are expressing (e.g., are their eyebrows raise in surprise/shock?). Once event module 160 has identified current emotions, module 160 sends instructions to event API server 130 to display animations around user's video feeds indicating the identified emotions.

FIGS. 6A and 6B are diagrams illustrating examples of speaking time for different users. In FIG. 6A, speaking time is shown by the size of a speaker's graphical representation (e.g., video feed), while in FIG. 6B, speaking time is shown by the size of a decoration around the speaker's icon.

When several users are conversing within a sub-group, the relative speaking time of each user may be presented visually. The two example implementations shown in FIGS. 6A and 6B are two examples of such visual representations. In both examples, speaker S1 is illustrated as having spoken 70%, speaker S2 is shown as having spoken 20%, and speaker 3 is shown as having spoken 5% or less of the amount of time an event has been active. These indications may assist users both within and outside of the sub-group in determining whether they want to leave or join this sub-group, respectively. For example, if one person in a sub-group has been speaking for 70% of the conversation, users might prefer to join a more balanced conversation (e.g., where the speaking time is broken up evenly between users of the group). Event module 160 may track the duration of an event as well as various speaking times for different users within the event. In this way, event module 160 is able to determine the total speaking time of different users in an event relative to one another ad represent these speaking times by altering the user interface of the event in real-time.

Example Method

Figure 7:
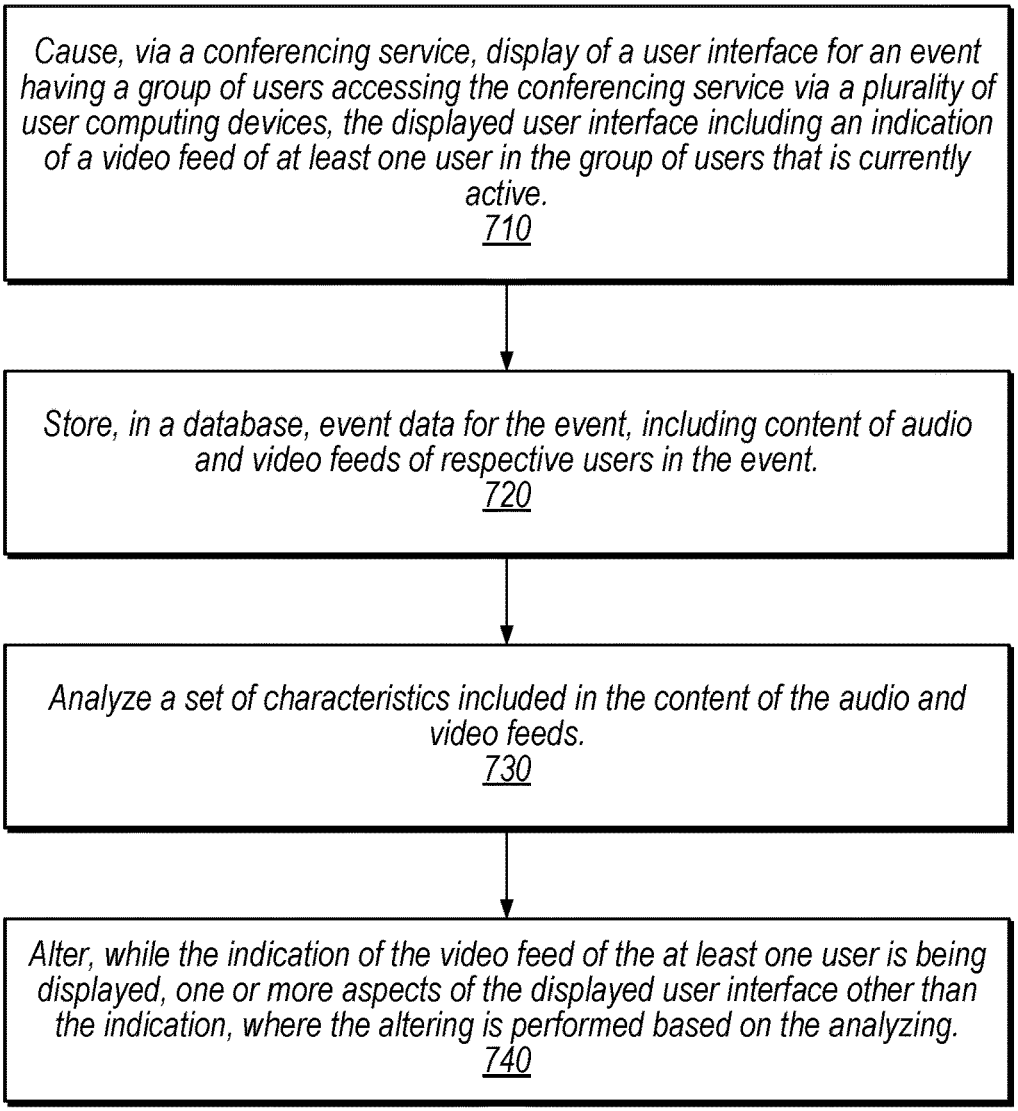
FIG. 7 is a flow diagram illustrating an example method for altering a displayed user interface for an event based on analyzing characteristics of audio and video feed content of the event, according to some embodiments.

Turning now to FIG. 7, a flow diagram illustrates a method 700 for altering a display event user interface based on analyzing characteristics of audio and video feed content of the event, according to some embodiments. The method shown in FIG. 7 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In some embodiments, the elements of method 700 are performed by online conferencing system 100.

At 710, in the illustrated embodiment, a server computer system causes, via a conferencing server, display of a user interface for an event having a group of users accessing the conferencing service via a plurality of user computing devices, the displayed user interface including an indication of a video feed of at least one user in the group of users that is currently active. For example, a user interface of an event may display a video feed of a user that is currently speaking using a larger size feed than video feeds of other users within the event, may display this user's video feed with a highlighted ring around it, etc. In some embodiments, the at least one user in the group of users that is currently active is a user that is currently speaking. In some embodiments, causing display of the first set of user interface elements includes overlaying the elements on a display of a first sub-group of the group of users associated with the current conversation. For example, symbols may be displayed on top of video feeds of users within the first sub-group of users. In some embodiments, the first set of user interface elements includes one or more images.

At 720, the server computer system stores, in a database, event data for the event, including content of audio and video feeds of respective users in the event. In some embodiments, the server computer system stores event data for the event in live event database 190 shown in FIG. 1. For example, the server computer system may store data that includes everything said by different users during a live event. The system may store both video files as well as images (e.g., screenshots) of user's video feeds during a live event.

At 730, the server computer system analyzes a set of characteristics included in the content of the audio and video feeds. In some embodiments, analyzing the set of characteristics included in the content of the audio and video feeds includes: transcribing audio feeds of one or more users in the group of users, extracting one or more keywords from the transcript of the audio feeds, and mapping respective extracted keywords to a first set of user interface elements. For example, the server computer system attempts to determine a current conversation topic of users within the event by analyzing the terms they are speaking. The server computer system may perform any of various speech recognition techniques to analyze the audio feeds of users in the event. In some embodiments, the mapping includes mapping respective extracted keywords to one or more symbols, where the symbols indicate a current topic of a conversation occurring in the event.

At 740, the server computer system alters, while the indication of the video feed of the at least one user is being displayed, one or more aspects of the displayed user interface other than the indication, wherein the altering is performed based on the analyzing. In some embodiments, the altering includes causing display of the first set of user interface elements, where the first set of user interface elements indicates semantics of a current conversation occurring in the event. For example, the server computer system may display symbols overlayed on a portion of the user interface displaying a sub-group of users in the event. These symbols may indicate what users in the sub-group are currently discussing (e.g., weddings, sports, summer vacations, etc.).

In some embodiments, the server computer system determines, based on tracking activity within audio feeds of users in the group of users, respective lengths of speaking time for users in the group of users during the event. In some embodiments, the server computer system alters, system based on the determined lengths of speaking time, the user interface to update indications of video feeds of one or more users in the group of users.

In some embodiments, altering one or more aspects of the displayed user interface includes changing one or more aspects of video feeds of one or more users in the group of users, where the one or more aspects include one or more of the following types of aspects: size, shape, color, opacity, and location. In some embodiments, the altering includes in response to determining that a user is distracted by a display of a current video feed showing the user in real-time via a user interface of a computing device utilized by the user to access the conferencing service, replacing the current video feed of the user with a new video feed to the user, wherein the new video feed is smaller in size than the current video feed.

In some embodiments, causing display of the user interface for the event having the group of users includes receiving, via the displayed user interface from a particular user of the group of users, a sub-group request, where the sub-group request relates to a particular sub-group and does not require the particular user to have administrative privileges for the conferencing service. In some embodiments, causing display of the user interface for the event having the group of users includes updating, in response to the sub-group request, the user interface. In some embodiments, the updated user interface permits the particular user to perform audio and video interactions with members of the particular sub-group. In some embodiments, the updated user interface indicates current sub-groups of other users of the group of users but does not permit the particular user to perform audio and video interactions with users in those other sub-groups.

In some embodiments, causing display of the user interface for the event having the group of users includes causing display of one or more sub-groups of users included in the group of users, where a first set of users included in a first sub-group are shown video feeds of users in the first set of users. In some embodiments, a second set of users included in a second, different sub-group are shown video feeds of users in the second set of users and are not shown video feeds of users in the first set of users.

In some embodiments, analyzing the set of characteristics included in the content of the audio and video feeds includes: transcribing audio feeds of one or more users in the group of users, extracting one or more keywords from the transcript of the audio feeds, and mapping respective extracted keywords to one or more user interface elements. In some embodiments, the set of characteristics included in the content of the audio and video feeds includes one or more of the following types of characteristics: speaking time, speaking volume, semantics of sub-group conversations, and user distraction.

In some embodiments, the altering includes causing display of a first set of user interface elements, where the first set of user interface elements indicates semantics of a current conversation occurring in the event. In some embodiments, the first set of user interface elements includes one or more symbols. In some embodiments, displaying, based on analyzing the audio feeds of users in the group of users, a user interface element indicating that at least two users in the group of users are speaking at the same time.

In some embodiments, altering one or more aspects of the displayed user interface includes changing one or more aspects of video feeds of one or more users in the group of users, where the one or more aspects include one or more of the following types of aspects: size, shape, color, opacity, and location. In some embodiments, the altering includes, in response to receiving an indication that a user is distracted by a display of a current video feed showing this user in real-time via a user interface of a computing device utilized by the user to access the conferencing service, replacing the current video feed of the user with a new video feed of the user, wherein the new video feed is displayed with a greater amount of opacity than the current video feed. For example, altering the size of a user's video feed may reduce user distraction caused by their own video feed during an event. In some embodiments, reducing the distraction of user's video feed includes automatically updating the user's video feed based on different characteristics associated with this user. For example, the size, opacity, location, shape, color, etc. of the user's video feed may be altered based on the size of the user sub-group, the screen size of their device, the size of the event itself, etc.

In some embodiments, the set of characteristics included in the content of the audio and video feeds includes one or more of the following types of characteristics: speaking time, speaking volume, semantics of sub-group conversations, and user distraction. In some embodiments, the altering includes displaying, based on analyzing the audio feeds of users in the group of users, a user interface element indicating that at least two users in the group of users are speaking at the same time.

In some embodiments, the altering includes, in response to detecting a new conversation occurring in the event, replacement of the displayed first set of user interface elements with a display of a second, different set of user interface elements, where the second set of user interface elements indicates semantics of the new conversation. In some embodiments, altering one or more aspects of the displayed user interface other than the indication includes altering a size of at least one video feed. In some embodiments, the altering includes, in response to determining that a user is distracted by a display of a current video feed showing this user in real-time via a user interface of a computing device utilized by the user to access the conferencing service, replacing the current video feed of the user with a new video feed of the user, where the new video feed is displayed with a greater amount of opacity than the current video feed.

Figure 8A:
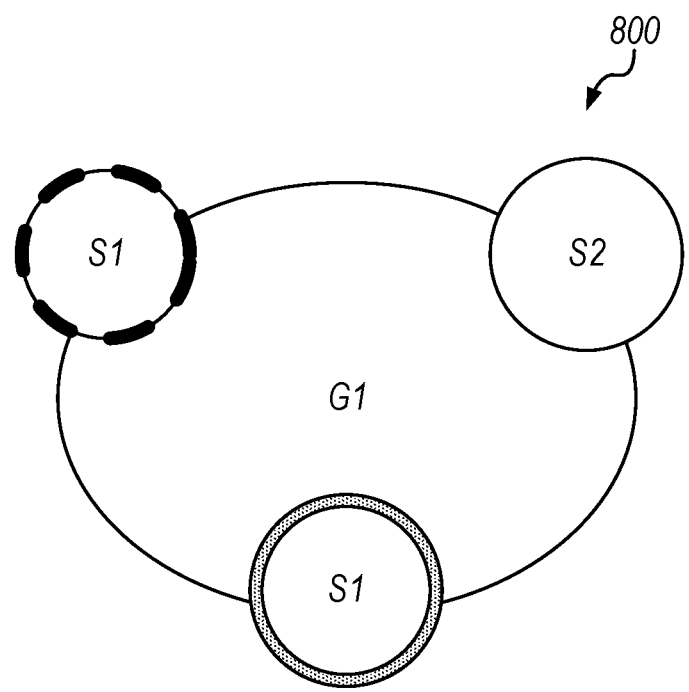
FIGS. 8A and 8B are diagrams illustrating example indications of speaker focus, according to some embodiments.
Figure 8B:
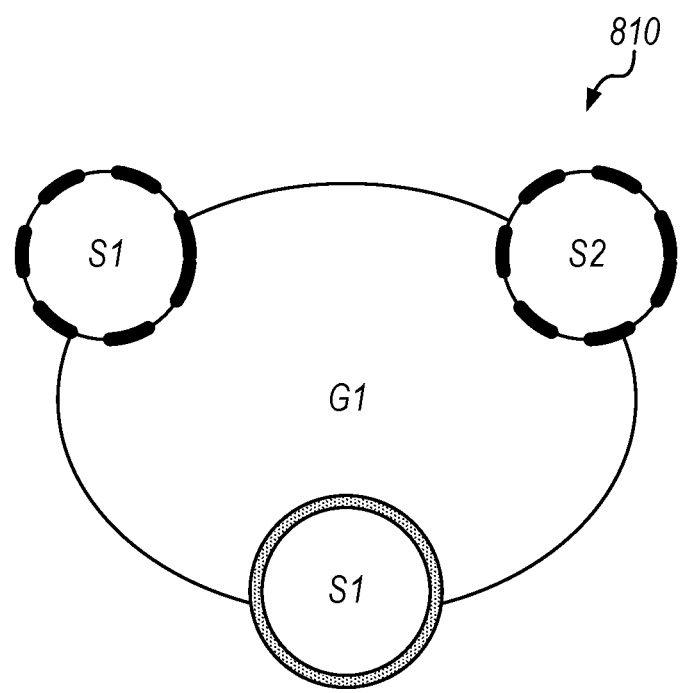

In addition to providing indications of crosstalk, the disclosed techniques allow a speaker to indicate a focus of their conversation. In some situations, this may advantageously prevent crosstalk. In a multi-person conversation, portions of conversations are not necessarily directed at all users in a group. Often a statement may be directed to a single person or a sub-group. When people meet in person, this focus may be indicated by a combination of visual focus and body orientation towards the intended recipient(s) of a statement. In FIGS. 8A and 8B, example indications of speaker focus are shown. In FIG. 8A, diagram 800 shows group G1 with speaker S3 encircled in green indicating that they are actively speaking. In addition, in diagram 800, user S1 is shown in dotted black lines. This may be shown in response to speaker S3 hovering their mouse over or selecting this user as the intended recipient for what they are about to say. If, for example, the device that a user is operating on is a tablet, the user may employ finger gestures instead of a mouse hover. A speaker may indicate multiple users as an intended audience, as shown in diagram 810. The diagrams shown in FIGS. 8A-8B may be displayed in a user interface via the event module 160, for example. In addition, the event module 160 (e.g., via a microphone or other hardware on the user's device) may be used to detect the various indicators from users (e.g., loudness, emotion, length of speaking time, crosstalk, focus, etc.). Distribution of such data (e.g., the decorations shown around the speaker's icon) to other users may be performed by the event API server 130. In some situations, this may advantageously avoid uncomfortable social interactions. For example, if there are two people in a group named Ethan, a speaker that has a question for the first Ethan can simply indicate that they are directing their question at the first Ethan. This may avoid confusion and ultimately awkward interactions within the platform. In addition, indications of speaker focus may mimic the natural flow of conversation that occurs in face-to-face interactions. As one specific example, during a face-to-face conversation Paul may turn to face Antonia and say, "Goodness, I got home so late last night, I could barely get up this morning." Antonia responds to Paul, "Same here!" Paul then turns to face the group and says "Antonia and I went country dancing at The Broken Spoke last night. That place is fun, but dangerous!" Speaker focus indications may provide for this type of interaction in virtual conversations.

Private Conversations within Sub-Groups

In a group conversation, sometimes two people would like to speak to each other privately, even though they are still part of a larger group. For example, in a group of four people, two may be discussing politics which are of little or no interest to the other two participants. FIG. 9 is a diagram illustrating an example whisper feature which facilitates smaller private conversations within a larger group conversation. In the illustrated embodiment, diagram 900 illustrates a group G1 in which the discussion is primarily focused on politics. Users S1 and S2 are actively speaking in the illustrated embodiment, but user S3 would like to speak with user P4 privately. In the virtual environment, the disclosed techniques provide a tool for opening a private audio channel. For example, as illustrated by diagram 910, users S3 and S4 can open a private channel that is not audible to users S1 and S2. In some embodiments, users S3 and S4 are still able to hear the of conversation other users in group G1 who are not included in the private audio channel. In some embodiments, users S3 and S4 can toggle their audio between their private conversation and the larger group conversation. That is, user S3 can say something to user S4 over their private channel and then switch to the public audio channel of the larger group G1 and speak to all users in the group (i.e., S1, S2, and S4). The diagrams shown in FIG. 9 may be displayed in a user interface via event module 160, while the routing of audio to sub-groups of users (e.g., private conversations) may be performed by the event API server 130 and the media server 140. The private conversation tool within the conferencing platform may be referred to as "whisper."

In a live event, people often communicate in non-verbal ways. For example, people may wave, smile, frown, roll their eyes, etc. Some of these messages are meant to be public, while others may be intended for a private audience. In the disclosed techniques, alternatives to physical, non-verbal communication are contemplated for virtual events. Specifically, the disclosed system may allow event attendees to send symbols or typed phrases to people in their current sub-group, people in other sub-groups, and people who are alone. These messages may be public or private. The symbols or text messages, or both that can be transmitted may be referred to in the context of the disclosed online conferencing platform as emojos. To send a symbol, a user selects a recipient. After a recipient is selected, a contextual list of symbols is displayed to the user. Once a user selects a symbol from the list, it is sent to the recipient. In this scenario, the recipient is able to see the symbol appear on or near his or her video feed. In some situations, the sender may not be obvious. Consequently, the symbol may be accompanied by the sender's avatar and name. If the non-verbal communication is public, other event attendees will see the symbol leave the sender's avatar and travel to the recipient's avatar. Event module 160 may display symbol to users in a user interface, while event API server 130 may distribute these symbols to the intended end user. For example, one user may send a waving hand symbol to another user at an event. This symbol may mimic the situation in an in-person event in which this user would wave across the room at a friend. Other examples of symbol include: beckoning (come here), plea for help (e.g., please come rescue me from this boring conversation), etc.

Sub-Groups within an Event

Figure 10:
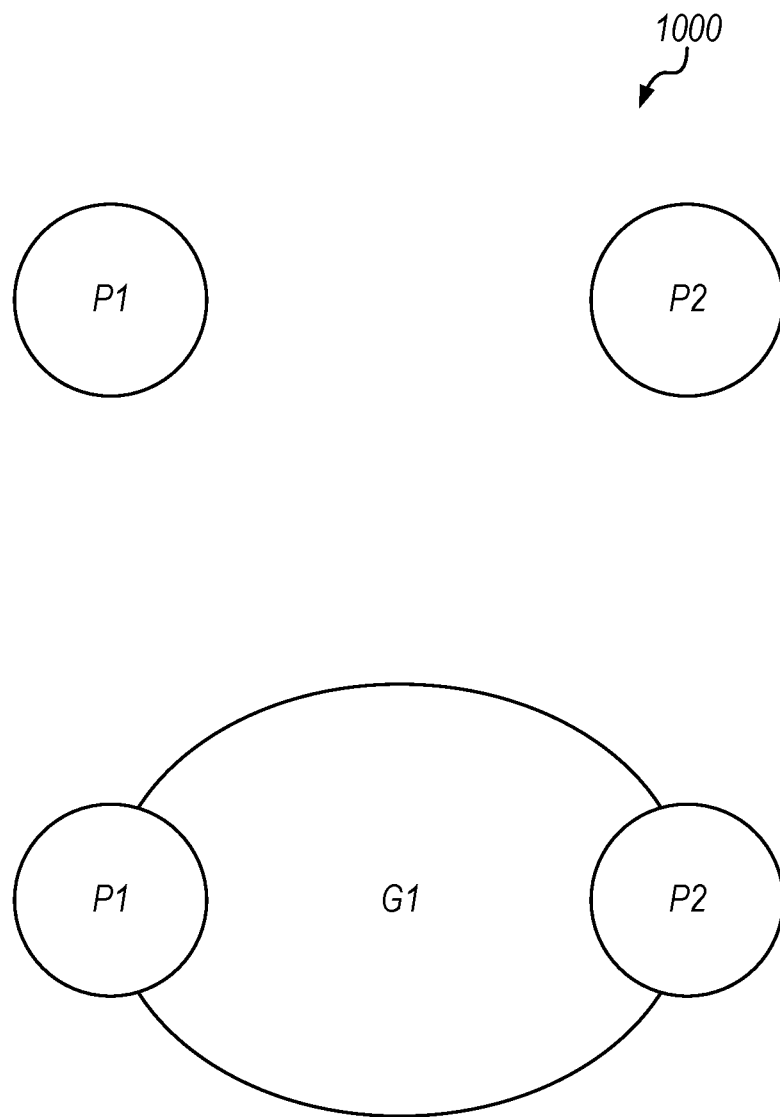
FIG. 10 is a diagram illustrating an example of creating a group within an event, according to some embodiments.

FIG. 10 is a diagram illustrating example sub-group creation within an event. In the illustrated embodiment, diagram 1000 includes various icons representing users and a sub-group.

In the illustrated embodiment, two users "P1" and "P2" are shown separately within an event space but are not yet part of a sub-group. One (or both) of users P1 and P2 can create a sub-group within an event by selecting (e.g., clicking, tapping, etc.) another individual attending the event who is not already in a sub-group, e.g., P1 can select P2. Once a sub-group is created, the individuals may be joined in a video conference. In the lower portion of the illustrated embodiment P1 and P2 are shown to be in a sub-group together. This sub-group is included in a particular event.

FIGS. 11A and 11B are diagrams illustrating examples of a user joining sub-groups. In FIG. 11A, diagram 1100 includes a sub-group G1 with users P2 and P3. User P1 can choose to join sub-group G1 by selecting (e.g., clicking, tapping, etc.) on the icon for G1. Once user P1 has joined sub-group G1 as shown in the lower half of diagram 1100, this user can see and hear the live video and audio feeds of users P2 and P3. Prior to joining sub-group G1, user P1 may not be able to see or hear live feeds for users in the sub-group. For example, users P2 and P3 may appear as icons or images (e.g., profile pictures) to user P1 prior to this user joining their sub-group.

In FIG. 11B, diagram 1110 shows that user P1 is included only in sub-group G1, while diagram 1120 shows that user P1 may be included in either sub-group G1 and G2. Users P1-P3 are able to interact with sub-groups at will. As discussed above, once users are admitted to an event, they are able to join, leave, form, etc. various sub-groups without administrative involvement. In some embodiments, a particular user may wish to introduce a member of a current group to a user in another group. In this scenario, the particular user may temporarily leave a current group to join another group with the desired individual to be introduced, make the introduction, then revert to the current group.

Figure 11C:
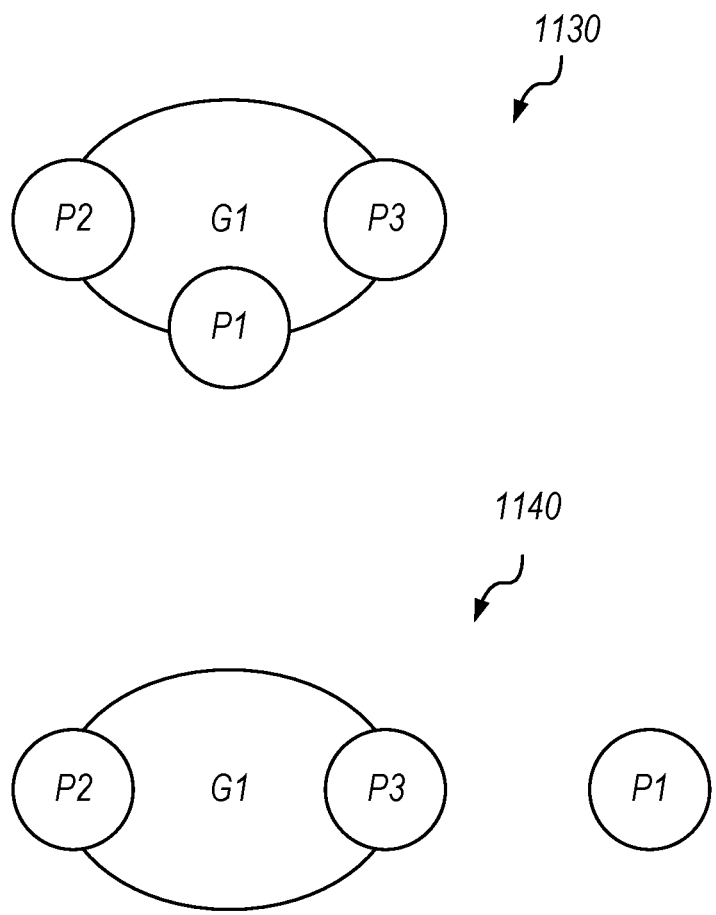

Turning now to FIG. 11C, a diagram illustrating an example of a user leaving a sub-group is shown. In the illustrated embodiment, diagram 1130 shows a sub-group G1 with three users P1, P2, and P3, while diagram 1140 shows that user P1 has left the sub-group. In order to leave the sub-group, user P1 hovers their mouse over the center of the sub-group's pop-up user interface. In response to the hovering mouse, a "leave" button appears in the center of the pop-up. For example, the request to leave the particular sub-group may be performed via a graphical element that is transiently displayed over an indication of the particular sub-group on the user interface. The user is then able to click on the button and is returned to the main user interface for the event. This main user interface may include images (e.g., profile pictures) or icons of various users attending the event that are shown separately from one another when these users are not included in a sub-group.

The diagrams shown in FIGS. 9-11C may be displayed via a user interface of a user computing device utilized by a user to access an event facilitated by system 100. In addition, the routing of audio and video for the events shown in these diagrams may be facilitated by the event API server 130 and the media server 140 and provided to the end user via event module 160.

Speaking Dynamics

FIGS. 12A and 12B are diagrams illustrating examples of a "do-not-disturb" feature. In FIG. 12A, diagram 1200 shows a situation in which a third user P3 joins an "open" group G1. In contrast, in FIG. 12B, diagram 1210 shows a situation in which user P3 attempts to join a "closed" group G1 and is rejected.

Sometimes a group of speakers may wish to prevent others from joining a group. In a social setting, this desire may be communicated using body language such as avoiding eye contact with someone who has expressed interest in joining a group of people standing together and talking. In a virtual environment, however, this is not possible. Therefore, the disclosed techniques provide a do-not-disturb mechanism for excluding additional users from joining a private group. For example, one of users P1 and P2 may wish to have a private conversation and may click a do-not-disturb button in order to keep others from joining the group. Consider a situation in which a group has been closed and a user who is not currently a member of the closed group would like to join this group. In this situation, the user may request permission to join the group and a user who clicked the do-not-disturb button to create the closed group may grant permission to the user requesting access. In some situations, a user may join a queue in order to be notified when a private group is no longer operating under a private mode. Upon notification, this user will be able to join the group, because it will be an open group at that time. The diagrams shown in FIGS. 12A and 12B may be displayed in a user interface via the event module 160, for example. Enforcement of the do-not-disturb feature may be performed by the event API server 130.

Event Exploration

During an event, a user may know that a particular individual is also attending an event and would like to find he or she at the event in order to connect. In events with hundreds of attendees, however, this may be difficult (just as in real life). In addition, the user interface of the event may have an area that is larger than the screen of a user's device. As a result, the user may have to move the horizontal or vertical view of the user interface to be able to see different portions of the event and different users attending the event. In this scenario, it may be difficult to locate the avatar of a particular user. The disclosed techniques allow for identification of various users' locations using both a search feature and direct exploration within the user interface of an event. For example, the search feature may facilitate direct exploration of users within the event by highlighting the icons of users who match entered search criteria. A search may return a list of participants who match the search criteria. This list may include both images and names of users. These features (e.g., a search bar) as well as the search results may be displayed in a user interface via the event module 160. In addition, a user entering a search may request additional information, such as a participant information (PI) panel as shown in FIG. 13. A user may also choose to locate other users via direct exploration. For example, using a mouse, hand gestures, key strokes, etc. a user can view different portions of a user interface of an event in order to find other users attending the event.

When users attend an event using the disclosed system, their default representation may be a static avatar that includes their initials or name, or both. These features, however, can be set and altered by the participant. Upon joining a group, a user's avatar may be replaced by a live audio-video feed sent by the user's device (e.g., personal computer (PC), tablet, phone, etc.). In some situations, however, a user may want to know additional information about other users attending the event. For example, a user may wish to know more about a particular person before starting a group and beginning a conversation with that person. In still other situations, a user may wish to search generically for certain attributes (e.g., job experience in web development) without having a particular user at an event in mind. The disclosed techniques provide dynamically-constructed PI panels that can be requested by various users during the event. The PI panels are dynamic in order to provide data about a user that is most relevant to another user requesting this information, for example. That is, a first user may see the job title for a particular user, while a second user sees a list of hobbies for the particular user.

FIG. 13 provides an example PI panel 1300 for a user named Richard Foxnick. In some embodiments, PI panels include two sets of information that may be displayed. First, a public, non-personalized set of information may include: LINKEDIN profile data, FACEBOOK data, tweets, a customizable emblem that is attached to the guest's profile image (e.g., "ask me about finance"), etc. A second, more personalized set of data may also be displayed, including: date of last event attended together, recent direct messages (DMs), recent email exchanges, recent topics of conversation, shared interests, shared locations, etc. This second set of information may only be viewable with permission from the user with which it is associated, to maintain the privacy of that user. In some situations, the PI panel includes data such as age, gender, languages spoken, etc. The event module 160 may display the information shown in FIG. 13 to various users. This application may receive the requested PI from the event API server 130. An additional component (not shown in FIG. 1) may be used to generate an aggregate of the PI for a given user as well as provide structure and indexing of such data prior to storage in one of databases 170, 180, and 190.

Example User Interfaces

Figure 14:
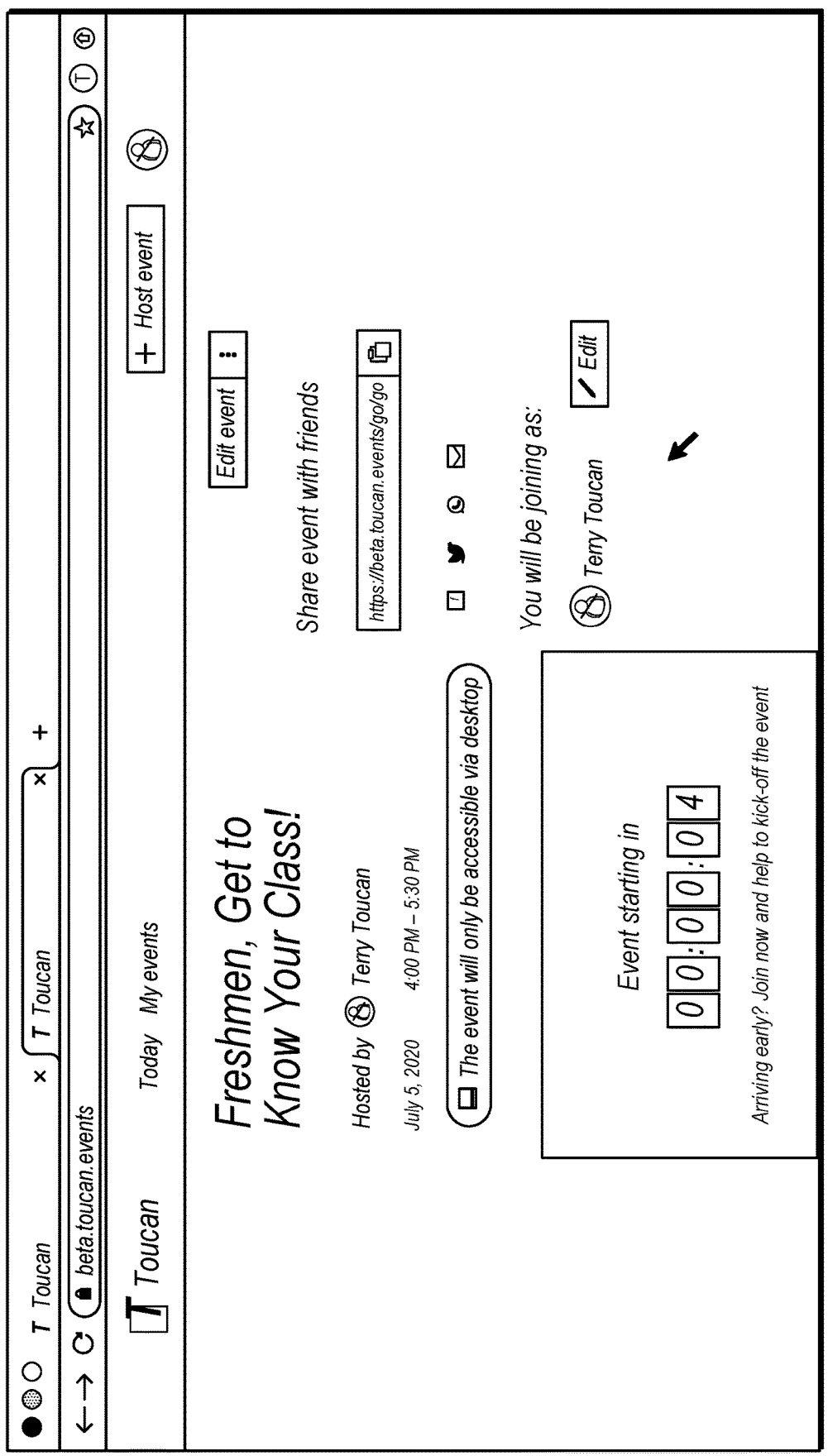
FIG. 14 is a diagram illustrating an example user interface displaying an event homepage, according to some embodiments.

Turning now to FIG. 14, an example user interface (UI) 1400 for a Toucan event is shown. In the illustrated embodiment, an event homepage is shown for the event titled "Freshmen, Get to Know Your Class!". This exemplary UI provides details for a particular event a user has been invited to attend, including the name of the host, date and time, a countdown timer, etc. Once the countdown timer has reached zero, a user may be presented with a button to join the event. User interface 1400 is one example of an interface that may be displayed by setup module 150 shown in FIG. 1.

FIGS. 15A and 15B show example user interfaces for a sub-group of users within an event. FIG. 15A shows a user interface 1500 of a sub-group of five users, with a live video feed for each user. In FIG. 15B, a user interface 1510 is shown with a sixth user that has joined the sub-group. This user is also shown with a live video feed. Note that the user viewing the sub-group UI has four different options (via icons shown at the bottom center of their UI) for interacting with the sub-group. For example, the user may mute themselves, navigate to a different portion of the event (other than the sub-group within the event which they are currently viewing), leave the group, leave the event altogether, etc. FIGS. 15A and 15B may be displayed by event module 160 shown in FIG. 1, for example. In some embodiments, a user in the sub-group displayed in one of FIGS. 15A and 15B clicks on a "buddy view" button. This button alters the live video feed of that user to expand the width of their video, thus allowing this user to have a friend who is physically sitting or standing next to them join in on the sub-group interaction. For example, the circle displaying this user's video may expand to include two connected circles, one large oval, etc.

Example Computing Device

Figure 16:
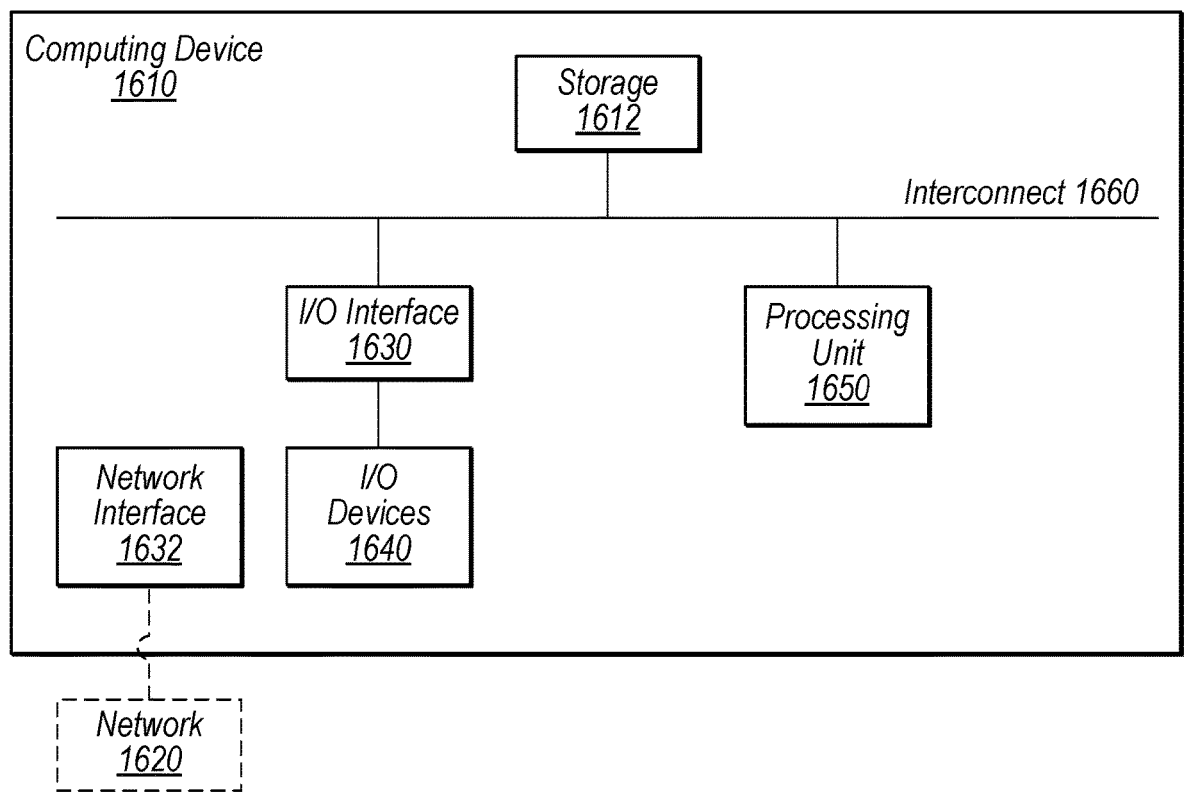
FIG. 16 is a block diagram illustrating an example computing device, according to some embodiments.

Turning now to FIG. 16, a block diagram of one embodiment of computing device (which may also be referred to as a computing system) 1610 is depicted. Computing device 1610 may be used to implement various portions of this disclosure, including the various modules, servers, systems and databases shown in FIG. 1, for example. Computing device 1610 is one example of an end user device that may be used by an end user to access conferencing system 100 for attending an online conferencing event. As shown, computing device 1610 includes processing unit 1650, storage 1612, and input/output (I/O) interface 1630 coupled via an interconnect 1660 (e.g., a system bus). Storage 1612 may be one or more of user and event database 170, image database 180, or live event database. I/O interface 1630 may be coupled to one or more I/O devices 1640. Computing device 1610 further includes network interface 1632, which may be coupled to network 1620 for communications with, for example, other computing devices.

In various embodiments, processing unit 1650 includes one or more processors. In some embodiments, processing unit 1650 includes one or more coprocessor units. In some embodiments, multiple instances of processing unit 1650 may be coupled to interconnect 1660. Processing unit 1650 (or each processor within 1650) may contain a cache or other form of on-board memory. In some embodiments, processing unit 1650 may be implemented as a general-purpose processing unit, and in other embodiments it may be implemented as a special purpose processing unit (e.g., an ASIC). In general, computing device 1610 is not limited to any particular type of processing unit or processor subsystem.

Storage subsystem 1612 is usable by processing unit 1650 (e.g., to store instructions executable by and data used by processing unit 1650). Storage subsystem 1612 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 1612 may consist solely of volatile memory, in one embodiment. Storage subsystem 1612 may store program instructions executable by computing device 1610 using processing unit 1650, including program instructions executable to cause computing device 1610 to implement the various techniques disclosed herein.

I/O interface 1630 may represent one or more interfaces and may be any of various types of interfaces configured to couple to and communicate with other devices, according to various embodiments. For example, I/O interface 1630 may represent a user interface for an online event executed by conferencing system 100. In one embodiment, I/O interface 1630 is a bridge chip from a front-side to one or more back-side buses. I/O interface 1630 may be coupled to one or more I/O devices 1640 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such as "a," "an," and "the" are intended to mean "one or more" unless the context clearly dictates otherwise. Reference to "an item" in a claim thus does not preclude additional instances of the item.

The word "may" be used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, a system having a processor unit and a memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

For purposes of United States law, reciting in the appended claims that a structure is "configured to" perform one or more tasks is expressly intended not to invoke 35 U.S.C. § 112(f) for that claim element. Should Applicant wish to invoke Section 112(f) during prosecution in a U.S. application, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. A method, comprising:
    causing, by a server computer system via a conferencing service, display of a user interface for an event having a group of users accessing the conferencing service via a plurality of user computing devices, the displayed user interface including indications of video feeds of respective users in a particular sub-group of users in the group of users that is currently active;
    storing, by the server computer system in a database, event data for the event, including content of audio and video feeds of respective users in the particular sub-group;
    analyzing, by the server computer system, a set of characteristics included in the content of the audio and video feeds; and
    altering, by the server computer system based on the analyzing and while the indications of the video feeds of users in the particular sub-group are being displayed, one or more aspects of the displayed user interface other than the indications of the video feeds of the particular sub-group, wherein the altering includes updating indications of video feeds of one or more users at least in the particular sub-group of users to display visual indications of speaking time of respective users in the particular sub-group of users relative to other users in the particular sub-group of users based on determined lengths of speaking time for users in the particular sub-group of users.

2. The method of claim 1, wherein analyzing the set of characteristics included in the content of the audio and video feeds includes:
    transcribing audio feeds of one or more users in the group of users;
    extracting one or more keywords from the transcript of the audio feeds; and
    mapping respective extracted keywords to a first set of user interface elements.

3. The method of claim 2, wherein the altering includes causing display of the first set of user interface elements, wherein the first set of user interface elements indicates semantics of a current conversation occurring in the event.

4. The method of claim 3, wherein causing display of the first set of user interface elements includes overlaying one or more of the user interface elements on a display of the particular sub-group of the group of users associated with the current conversation based on analysis of the audio feeds of the particular sub-group, wherein the overlayed display of the one or more user interface elements on the display of the particular sub-group is visible to users in the event outside of the particular sub-group of users.

5. The method of claim 2, wherein the mapping includes mapping respective extracted keywords to one or more symbols, and wherein the symbols indicate a current topic of a conversation occurring in the event.

6. The method of claim 2, wherein altering one or more aspects of the displayed user interface includes changing one or more aspects of video feeds of one or more users in the group of users, wherein the one or more aspects include one or more of the following types of aspects: size, shape, color, opacity, and location.

7. The method of claim 1, wherein causing display of the user interface for the event further includes displaying indications of users included in another sub-group of users, and an indication of a user that is separate from the particular sub-group and the another sub-group.

8. The method of claim 1, wherein the altering includes:
    displaying, based on analyzing the audio feeds of users in the group of users, a user interface element indicating that at least two users in the group of users are speaking at the same time.

9. The method of claim 1, wherein causing display of the user interface for the event having the group of users includes:

receiving, via the displayed user interface from a non-host user of the group of users, a sub-group request, wherein the sub-group request relates to the particular sub-group and does not require the non-host user to have administrative privileges for the conferencing service;

updating, in response to the sub-group request, the user interface, wherein the updated user interface:

permits the non-host user to perform audio and video interactions with members of the particular sub-group; and indicates current sub-groups of other users of the group of users but does not permit the non-host user to perform audio and video interactions with users in those other sub-groups.

10. A non-transitory computer-readable medium having program instructions stored thereon that are executable by a server computer system to perform operations comprising:

causing, via a conferencing service, display of a user interface for an event having a group of users accessing the conferencing service via a plurality of user computing devices, the displayed user interface including indications of video feeds of respective users in a particular sub-group of a plurality of sub-groups of users in the group of users that is currently active;

storing, in a database, event data for the event, including content of audio and video feeds of respective users in the particular sub-group;

analyzing a set of characteristics included in the content of the audio and video feeds; and altering, based on the analyzing and while the video feeds of users in the particular sub-group are being displayed, one or more aspects of the displayed user interface other than the indications of the video feeds of the particular sub-group, wherein the altering includes updating indications of video feeds of one or more users at least in the particular sub-group of users to display visual indications of speaking time of respective users in the particular sub-group of users relative to other users in the particular sub-group of users based on determined lengths of speaking time for users in the particular sub-group of users.

11. The non-transitory computer-readable medium of claim 10, wherein analyzing the set of characteristics included in the content of the audio and video feeds includes:

transcribing audio feeds of one or more users in the group of users;

extracting one or more keywords from the transcript of the audio feeds; and mapping respective extracted keywords to a first set of user interface elements.

12. The non-transitory computer-readable medium of claim 11, wherein the altering includes causing display of the first set of user interface elements, wherein the first set of user interface elements indicates semantics of a current conversation occurring in the event.

13. The non-transitory computer-readable medium of claim 12, wherein causing display of the first set of user interface elements includes overlaying one or more of the elements on a display of the particular sub-group of the group of users associated with the current conversation based on analysis of the audio feeds of the particular sub-group, wherein the overlayed display of the one or more user interface elements on the display of the particular sub-group is visible to users in the event outside of the particular sub-group of users.

14. The non-transitory computer-readable medium of claim 11, wherein the mapping includes mapping respective extracted keywords to one or more symbols, and wherein the symbols indicate a current topic of a conversation occurring in the event.

15. The non-transitory computer-readable medium of claim 11, wherein the altering includes:

displaying, based on analyzing the audio feeds of users in the group of users, a user interface element indicating that at least two users in the group of users are speaking at the same time.

16. A system, comprising:

at least one processor; and a memory having instructions stored thereon that are executable by the at least one processor to cause the system to:

cause via a conferencing service, display of a user interface for an event having a group of users accessing the conferencing service via a plurality of user computing devices, the displayed user interface including an indication of video feeds of respective users in a particular sub-group of a plurality of sub-groups of users in the group of users that is currently active;

store, in a database, event data for the event, including content of audio and video feeds of respective users in the particular sub-group;

analyze a set of characteristics included in the content of the audio and video feeds; and alter, based on the analyzing and while the indications of the video feeds of users in the particular sub-group are being displayed, one or more aspects of the displayed user interface other than the indications of the video feeds of the particular sub-group, wherein the altering includes updating indications of video feeds of one or more users at least in the particular sub-group of users to display visual indications of speaking time of respective users in the particular sub-group of users relative to other users in the particular sub-group of users based on determined lengths of speaking time for users in the particular sub-group of users.

17. The system of claim 16, wherein analyzing the set of characteristics included in the content of the audio and video feeds includes:

transcribing audio feeds of one or more users in the group of users; and inputting the transcript of the audio feeds into a machine learning model, wherein output of the machine learning model is user interface content, including one or more of the following types of content: image, video, animations, or text.

18. The system of claim 16, wherein causing display of the user interface for the event having the group of users includes:

receiving, via the displayed user interface from a particular user of the group of users, a sub-group request, wherein the sub-group request relates to the particular sub-group and does not require the particular user to have administrative privileges for the conferencing service;

updating, in response to the sub-group request, the user interface, wherein the updated user interface:

permits the particular user to perform audio and video interactions with members of the particular sub-group; and indicates current sub-groups of other users of the group of users but does not permit the particular user to perform audio and video interactions with users in those other sub-groups.

19. The system of claim 16, wherein the set of characteristics included in the content of the audio and video feeds includes one or more of the following types of characteristics: speaking time, speaking volume, semantics of sub-group conversations, and user distraction.

20. The system of claim 16, wherein the altering includes:
displaying, based on analyzing the audio feeds of users in the group of users, a user interface element indicating that at least two users in the group of users are speaking at the same time.

* * * * *